US012315680B2

(12) United States Patent
Tominaga et al.

(10) Patent No.: US 12,315,680 B2
(45) Date of Patent: May 27, 2025

(54) MULTILAYER CERAMIC ELECTRONIC COMPONENT

(71) Applicant: Murata Manufacturing Co., Ltd., Nagaokakyo (JP)

(72) Inventors: Ken Tominaga, Nagaokakyo (JP); Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 382 days.

(21) Appl. No.: 17/848,434

(22) Filed: Jun. 24, 2022

(65) Prior Publication Data

US 2023/0018369 A1 Jan. 19, 2023

(30) Foreign Application Priority Data

Jul. 16, 2021 (JP) ................................ 2021-117585

(51) Int. Cl.
*H01G 4/30* (2006.01)
*H01G 4/012* (2006.01)
*H01G 4/12* (2006.01)
*H01G 4/232* (2006.01)

(52) U.S. Cl.
CPC ............... *H01G 4/30* (2013.01); *H01G 4/012* (2013.01); *H01G 4/1227* (2013.01); *H01G 4/2325* (2013.01)

(58) Field of Classification Search
CPC ......... H01G 4/30; H01G 4/012; H01G 4/1227
USPC ..................... 361/301.4, 306.3, 321.1, 321.3
See application file for complete search history.

(56) References Cited

U.S. PATENT DOCUMENTS 8,125,763 B2 * 2/2012 Kobayashi ............. H01G 4/005 361/306.3
8,228,663 B2 * 7/2012 Takeuchi ............. H01G 4/2325 361/321.1
9,418,790 B2 * 8/2016 Takeuchi ............... H01G 4/232
2009/0290280 A1 11/2009 Takeuchi et al.
2009/0291317 A1 11/2009 Kawasaki et al.
2010/0128412 A1 * 5/2010 Nishihara ................ H01G 4/30 361/306.3
2015/0136463 A1 * 5/2015 Lee ........................ H01G 4/232 361/301.4
2015/0279562 A1 * 10/2015 Nishisaka ............ H01G 4/1227 361/301.4

(Continued)

FOREIGN PATENT DOCUMENTS

JP 8-306580 A 11/1996
JP 2009-283597 A 12/2009

(Continued)

*Primary Examiner* — Arun Ramaswamy
(74) *Attorney, Agent, or Firm* — Keating & Bennett, LLP

(57) ABSTRACT

A multilayer ceramic electronic component includes a multilayer body including ceramic layers that are laminated, first and second internal electrode layers respectively on the ceramic layers and exposed to first and second end surfaces, first and second external electrodes respectively connected to the first and second internal electrode layers. The first and second external electrodes include a base electrode layer including at least one of Ni, Cr, Cu, or Ti and a plating layer including lower, middle, and upper layer plating layers. A particle diameter of a metal included in the lower layer plating layer is larger than a particle diameter of a metal included in the middle layer plating layer.

14 Claims, 28 Drawing Sheets

IV-IV CROSS-SECTIONAL VIEW

(56) References Cited

U.S. PATENT DOCUMENTS

| | | | | |
|---|---|---|---|---|
| 2020/0105472 A1* | 4/2020 | Song | ...................... | H01G 4/236 |

FOREIGN PATENT DOCUMENTS

| | | |
|---|---|---|
| JP | 2009-283598 A | 12/2009 |
| JP | 2011-108875 A | 6/2011 |

* cited by examiner

IV–IV CROSS-SECTIONAL VIEW

VII-VII CROSS-SECTIONAL VIEW

XVII-XVII CROSS-SECTIONAL VIEW

XXIa-XXIa CROSS-SECTIONAL VIEW

XXIb-XXIb CROSS-SECTIONAL VIEW

XXIc–XXIc CROSS-SECTIONAL VIEW

XXId-XXId CROSS-SECTIONAL VIEW

MULTILAYER CERAMIC ELECTRONIC COMPONENT

CROSS REFERENCE TO RELATED APPLICATIONS

This application claims the benefit of priority to Japanese Patent Application No. 2021-117585 filed on Jul. 16, 2021. The entire contents of this application are hereby incorporated herein by reference.

BACKGROUND OF THE INVENTION

1. Field of the Invention

The present invention relates to a multilayer ceramic electronic component, and particularly, to a multilayer ceramic electronic component including an external electrode having a multilayer structure.

2. Description of the Related Art

In recent years, along with downsizing and multi-functionalization of electronic devices, there is also an increasing demand for products with a reduced size and an increased capacitance in multilayer ceramic electronic components mounted in the electronic devices.

A multilayer ceramic capacitor which is such a multilayer ceramic electronic component includes, for example, as described in Japanese Patent Laid-Open No. H8-306580, a ceramic sintered compact in which dielectric ceramics such as barium titanate and internal electrodes are alternately laminated, and a pair of external electrodes formed so as to cover individual end surfaces of the ceramic sintered compact.

As one of methods for achieving a reduced size and an increased capacitance, for example, there is a technique of forming an external electrode with a plating electrode (Cu plating) as disclosed in Japanese Patent Laid-Open No. 2009-283597. In Japanese Patent Laid-Open No. 2009-283597, a thickness of an external electrode is reduced by forming a plating electrode (Cu plating) directly on an electronic component main body, and an effective area of an internal electrode can be increased by an amount of the reduced thickness of the external electrode by making a ceramic element as large as possible within standard dimensions.

However, in a case where a plating electrode (Cu plating) is formed on a ceramic element as disclosed in Japanese Patent Laid-Open No. 2009-283597, when a thickness of the plating electrode at a portion connected to an internal electrode is reduced, an entry path of moisture from outside is short. This may cause entry of moisture from outside, resulting in a problem of deterioration in moisture resistance.

SUMMARY OF THE INVENTION

Preferred embodiments of the present invention provide multilayer ceramic electronic components that are each able to reduce or prevent moisture entry from outside while sufficiently maintaining a fixing strength with an internal electrode layer at a connection portion with the internal electrode layer even when an external electrode is a plating layer, and having high moisture resistance reliability.

A multilayer ceramic electronic component according to a preferred embodiment of the present invention includes a multilayer body including a plurality of ceramic layers that are laminated, and including a first main surface and a second main surface facing each other in a height direction that is a laminating direction, a first side surface and a second side surface facing each other in a width direction orthogonal or substantially orthogonal to the height direction, and a first end surface and a second end surface facing each other in a length direction orthogonal or substantially orthogonal to the laminating direction and the width direction, a first internal electrode layer on a ceramic layer of the plurality of ceramic layers and exposed to the first end surface, a second internal electrode layer on a ceramic layer of the plurality of ceramic layers and exposed to the second end surface, a first external electrode connected to the first internal electrode layer, and on the first end surface, on a portion of the first main surface, and on a portion of the second main surface, and a second external electrode connected to the second internal electrode layer, and on the second end surface, on a portion of the first main surface, and on a portion of the second main surface. In the multilayer ceramic electronic component, the first external electrode and the second external electrode include a base electrode layer and a plating layer, the base electrode layer is a thin film electrode on at least a portion of the first main surface and a portion of the second main surface and including at least one of Ni, Cr, Cu, or Ti, the plating layer includes a lower layer plating layer exclusively on the first end surface and the second end surface, a middle layer plating layer on the lower layer plating layer, on the first end surface and the second end surface on which the lower layer plating layer is not located, and on the base electrode layer, and an upper layer plating layer on the middle layer plating layer. When a sum of a thickness in the length direction of the lower layer plating layer and a thickness in the length direction of the middle layer plating layer located on the first end surface is defined as X1, a sum of a thickness in the length direction of the lower layer plating layer and a thickness in the length direction of the middle layer plating layer located on the second end surface is defined as X2, a sum of a thickness in the height direction of the base electrode layer and a thickness in the height direction of the middle layer plating layer located on the first main surface is defined as Y1, and a sum of a thickness in the height direction of the base electrode layer and a thickness in the height direction of the middle layer plating layer located on the second main surface is defined as Y2, relationships of $X1>Y1$, $X1>Y2$, $X2>Y1$, and $X2>Y2$ are satisfied, and a particle diameter of a metal included in the lower layer plating layer is larger than a particle diameter of a metal included in the middle layer plating layer.

In the preferred embodiment described above, when a sum of a thickness in the length direction of the lower layer plating layer and a thickness in the length direction of the middle layer plating layer located on the first end surface is defined as X1, a sum of a thickness in the length direction of the lower layer plating layer and a thickness in the length direction of the middle layer plating layer located on the second end surface is defined as X2, a sum of a thickness in the height direction of the base electrode layer and a thickness in the height direction of the middle layer plating layer located on the first main surface is defined as Y1, and a sum of a thickness in the height direction of the base electrode layer and a thickness in the height direction of the middle layer plating layer located on the second main surface is defined as Y2, the relationships of $X1>Y1$, $X1>Y2$, $X2>Y1$, and $X2>Y2$ are satisfied. This makes it possible to reduce a thickness in a thickness direction of the external electrode of the multilayer ceramic electronic component, and thus the multilayer body is able to be made as thick as possible within the standard dimensions, and a degree of freedom in designing an effective area of the internal electrode layer is able to be improved. In addition, since a plating layer having a sufficient thickness can be achieved on both end surface sides of the multilayer body from which the internal electrode layers are extracted, moisture entry from outside is able to be reduced or prevented.

Further, in the preferred embodiment described above, since a particle diameter of a metal included in the lower layer plating layer is larger than a particle diameter of a metal included in the middle layer plating layer, a particle diameter of the lower layer plating layer on a side closer to the internal electrode layer is large, and thus the number of grain boundaries is able to be reduced as compared with a case where the particle diameter is small. Therefore, it is possible to reduce a path of moisture entry. This makes it possible to reduce or prevent moisture entry into the multilayer ceramic electronic component.

Further, the middle layer plating layer including a metal having a particle diameter smaller than that of a metal included in the lower layer plating layer is located on the lower layer plating layer. As a result, since the particle diameter of metal particles of the middle layer plating layer is small, a compressive stress of the middle layer plating layer can be reduced. As a result, even when a thermal stress is applied, it is possible to reduce or prevent a tensile stress applied to a tip end portion of the middle layer plating layer, and it is possible to reduce or prevent an occurrence of cracks in the multilayer body caused by the thermal stress.

According to preferred embodiments of the present invention, it is possible to provide multilayer ceramic electronic components that are each able to reduce or prevent entry of moisture from outside while sufficiently maintaining a fixing strength with an internal electrode layer at a connection portion with the internal electrode layer even when an external electrode is a plating layer, and having high moisture resistance reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic electronic components according to preferred embodiments of the present invention will be described with reference to the drawings.

A. First Preferred Embodiment

1. Multilayer Ceramic Capacitor

Figure 1:
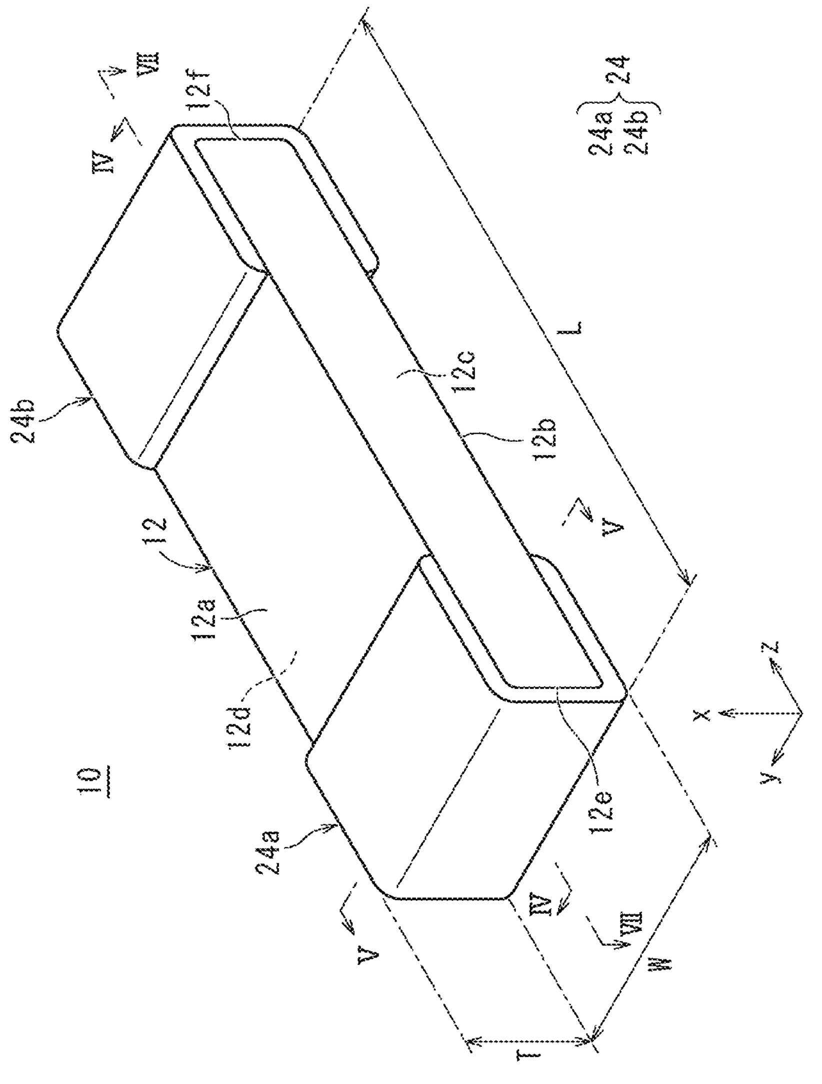
FIG. 1 is an external perspective view illustrating a multilayer ceramic capacitor as an example of a multilayer ceramic electronic component according to a first preferred embodiment of the present invention.
Figure 2:
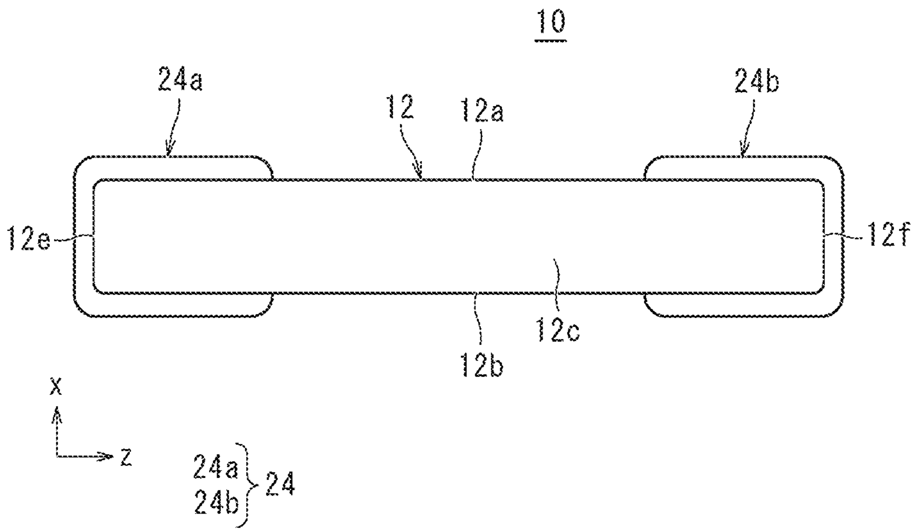
FIG. 2 is a front view illustrating the multilayer ceramic capacitor as an example of the multilayer ceramic electronic component according to the first preferred embodiment of the present invention.
Figure 3:
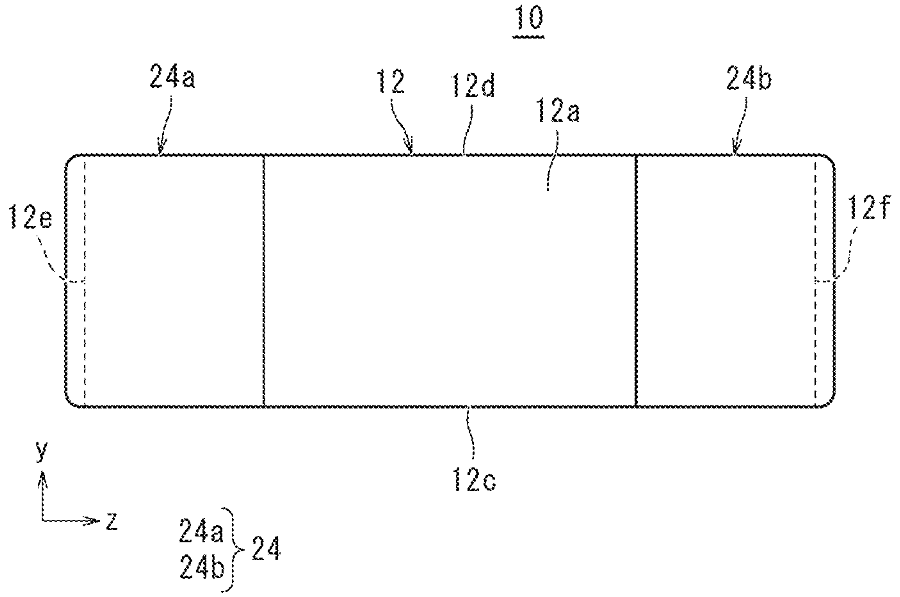
FIG. 3 is a top view illustrating the multilayer ceramic capacitor as an example of the multilayer ceramic electronic component according to the first preferred embodiment of the present invention.
Figure 4:
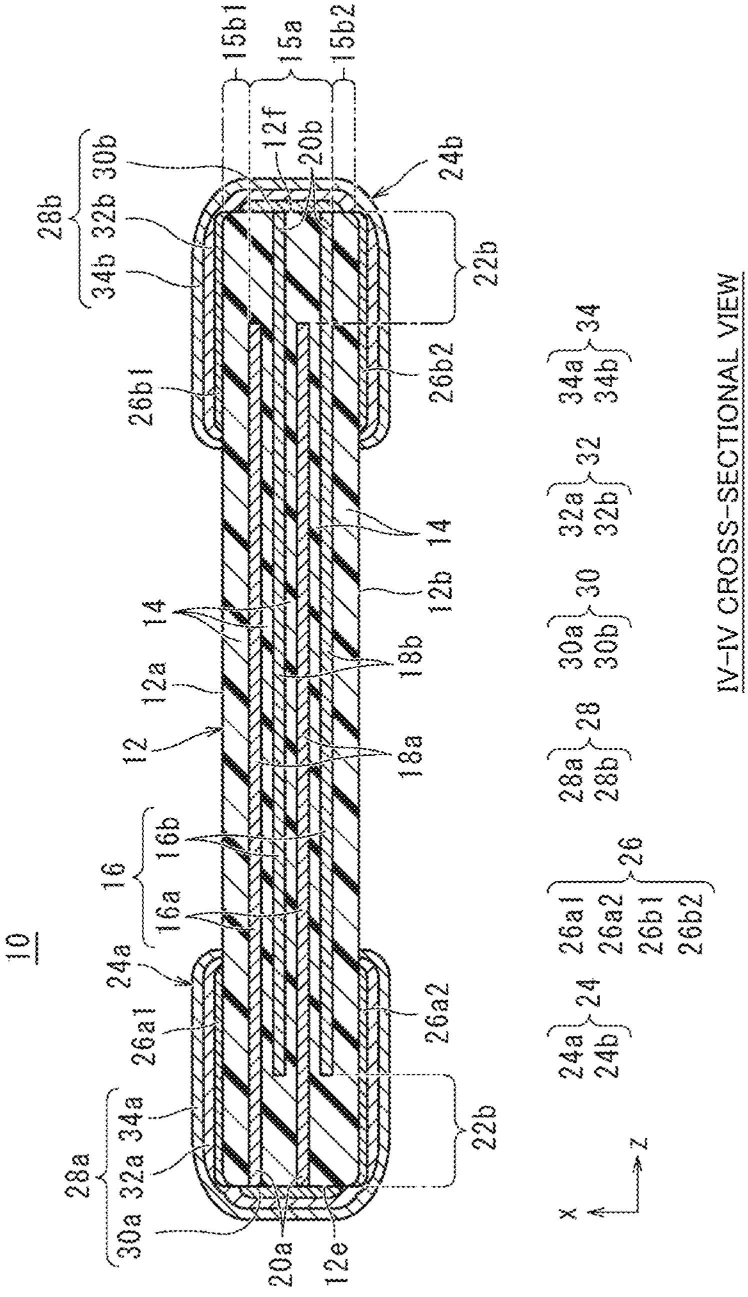
FIG. 4 is a cross-sectional view taken along line IV-IV according to FIG. 1.
Figure 5:
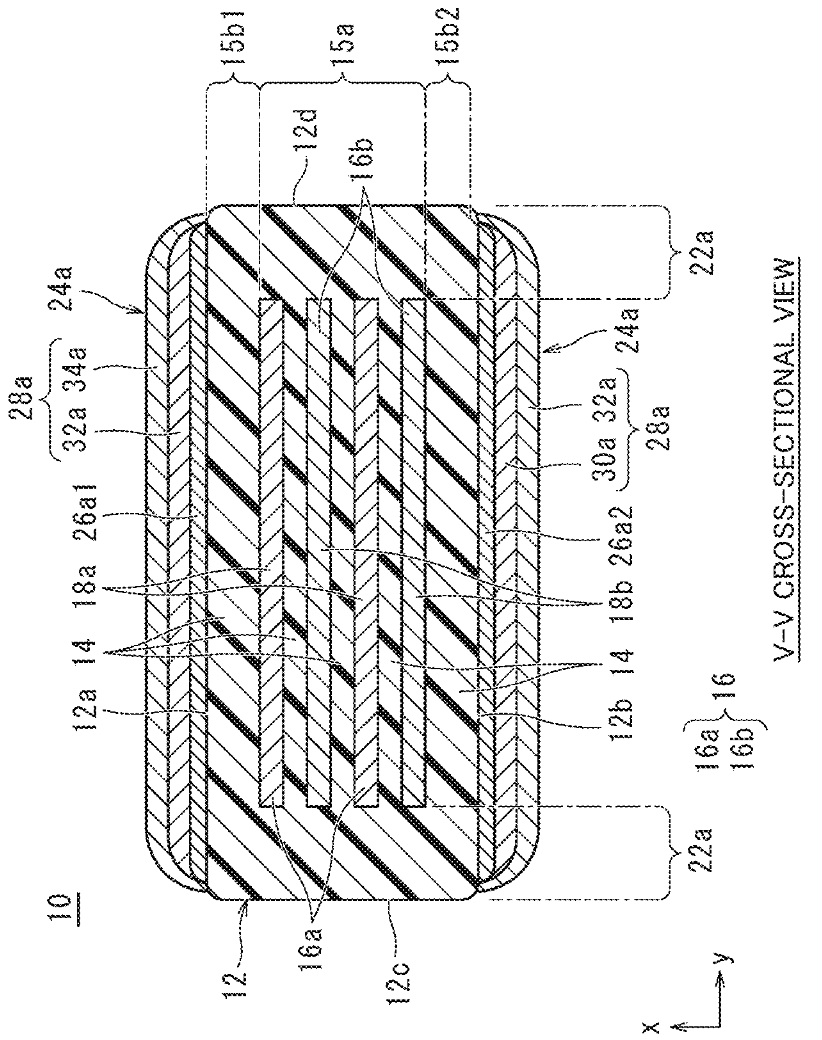
FIG. 5 is a cross-sectional view taken along line V-V according to FIG. 1.
Figure 6:
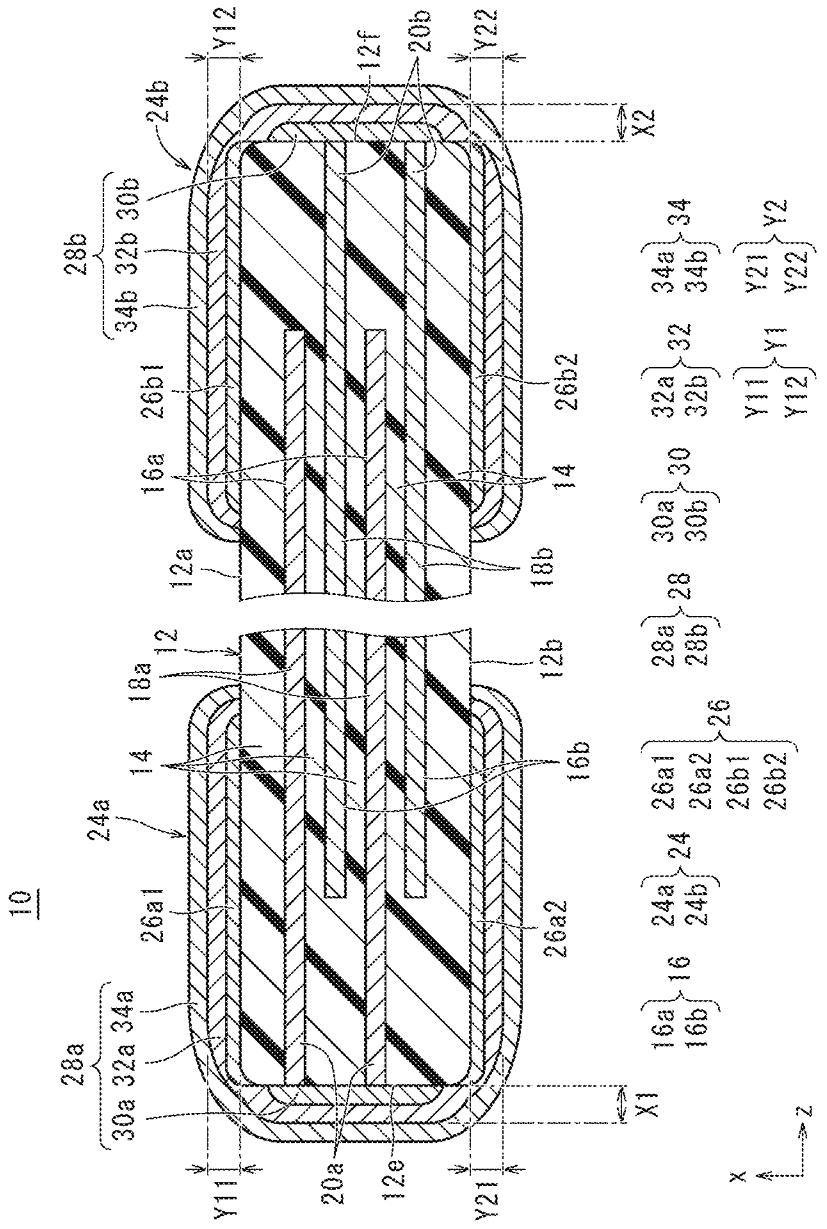
FIG. 6 is a cross-sectional view taken along line IV-IV according to FIG. 1, and is a schematic cross-sectional view for describing a structure of an external electrode of the multilayer ceramic capacitor as an example of the multilayer ceramic electronic component according to the first preferred embodiment of the present invention.
Figure 7:
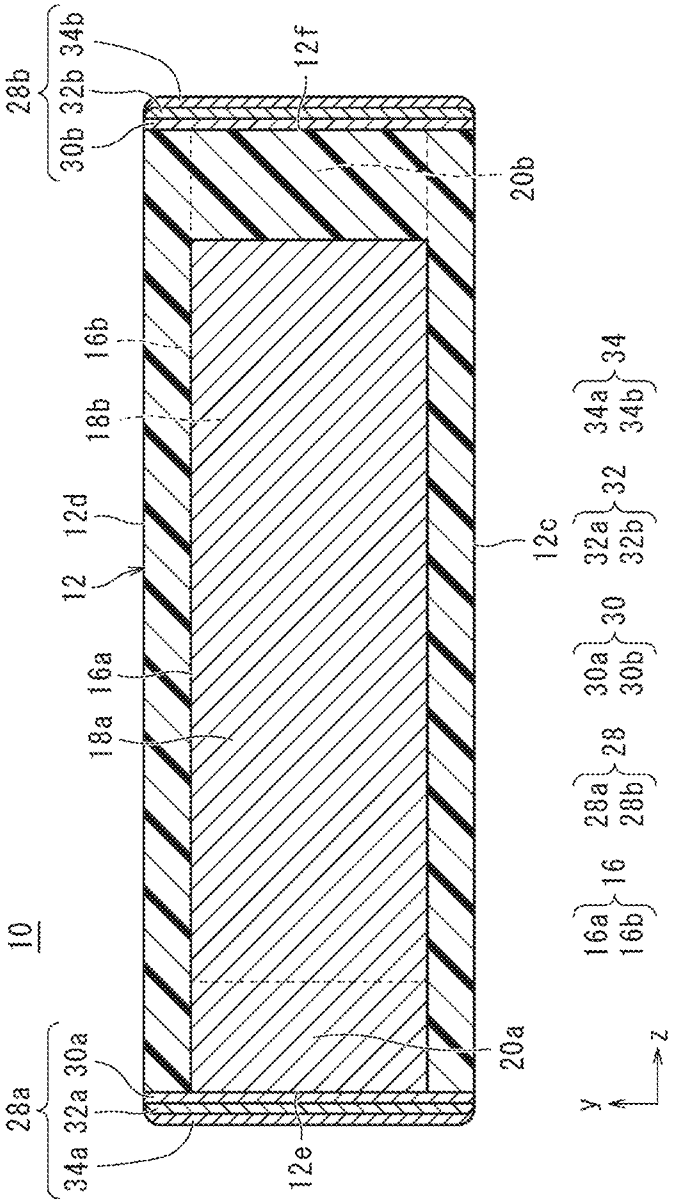
FIG. 7 is a cross-sectional view taken along line VII-VII according to FIG. 1.

A multilayer ceramic capacitor 10 as an example of a multilayer ceramic electronic component according to a first preferred embodiment of the present invention will be described. FIG. 1 is an external perspective view illustrating a multilayer ceramic capacitor as an example of a multilayer ceramic electronic component according to a first preferred embodiment of the present invention. FIG. 2 is a front view illustrating the multilayer ceramic capacitor as an example of the multilayer ceramic electronic component according to the first preferred embodiment of the present invention. FIG. 3 is a top view illustrating the multilayer ceramic capacitor as an example of the multilayer ceramic electronic component according to the first preferred embodiment of the present invention. FIG. 4 is a cross-sectional view taken along line IV-IV according to FIG. 1. FIG. 5 is a cross-sectional view taken along line V-V according to FIG. 1. FIG. 6 is a cross-sectional view taken along line IV-IV according to FIG. 1, and is a schematic cross-sectional view for describing a structure of an external electrode of the multilayer ceramic capacitor as an example of the multilayer ceramic electronic component according to the first preferred embodiment of the present invention. FIG. 7 is a cross-sectional view taken along line VII-VII according to FIG. 1.

Multilayer ceramic capacitor 10 includes a multilayer body 12 and an external electrode 24. Hereinafter, each configuration of multilayer body 12 and external electrode 24 will be described in this order.

Multilayer body 12 includes a plurality of laminated ceramic layers 14 and a plurality of internal electrode layers 16. Further, multilayer body 12 includes a first main surface 12*a* and a second main surface 12*b* facing each other in a height direction x, a first side surface 12*c* and a second side surface 12*d* facing each other in a width direction y orthogonal or substantially orthogonal to height direction x, and a first end surface 12*e* and a second end surface 12*f* facing each other in a length direction z orthogonal or substantially orthogonal to height direction x and width direction y. In this multilayer body 12, corner portions and ridge portions are rounded. The corner portion is a portion where three adjacent surfaces of multilayer body 12 intersect, and the ridge portion is a portion where two adjacent surfaces of multilayer body 12 intersect. In addition, irregularities or the like may be provided on a portion or all of first main surface 12*a* and second main surface 12*b*, first side surface 12*c* and second side surface 12*d*, and first end surface 12*e* and second end surface 12*f*.

As illustrated in FIGS. 4 and 5, multilayer body 12 includes an effective layer portion 15*a* in which a plurality of internal electrode layers 16 face each other in height direction x connecting first main surface 12*a* and second main surface 12*b*, a first outer layer portion 15*b*1 including a plurality of ceramic layers 14 located between first main surface 12*a* and internal electrode layer 16 located closest to first main surface 12*a*, and a second outer layer portion 15*b*2 including the plurality of ceramic layers 14 located between second main surface 12*b* and internal electrode layer 16 located closest to second main surface 12*b*.

First outer layer portion 15*b*1 is located on first main surface 12*a* side of multilayer body 12, and includes the plurality of ceramic layers 14 located between first main surface 12*a* and internal electrode layer 16 closest to first main surface 12*a* and between with the plurality of ceramic layers 14.

Second outer layer portion 15*b*2 is located on second main surface 12*b* side of multilayer body 12, and includes a plurality of ceramic layers 14 located between second main surface 12*b* and internal electrode layer 16 closest to second main surface 12*b* and between with the plurality of ceramic layers 14.

Then, a region sandwiched between first outer layer portion 15*b*1 and second outer layer portion 15*b*2 is effective layer portion 15*a*. The number of ceramic layers 14 to be laminated is not particularly limited, but is preferably, for example, greater than or equal to 10 and less than or equal to 700, including first outer layer portion 15*b*1 and second outer layer portion 15*b*2. Further, a thickness of ceramic layer 14 is preferably, for example, greater than or equal to about 0.4 μm and less than or equal to about 5.0 μm.

As a material, ceramic layer 14 can be made of, for example, a dielectric material. As the dielectric material, for example, a dielectric ceramic including $BaTiO_3$, $CaTiO_3$, $SrTiO_3$, $CaZnO_3$, or the like as a main component can be used. In addition, those obtained by adding an accessory component such as, for example, a Mn compound, an Fe compound, a Cr compound, a Co compound, or a Ni compound to these main components may be used.

Dimensions of multilayer body 12 are not particularly limited, preferably, for example, a dimension in length direction z is greater than or equal to about 0.1 mm and less than or equal to about 6.0 mm, a dimension in width direction y is greater than or equal to about 0.1 mm and less than or equal to about 6.0 mm, and a dimension in height direction x is greater than or equal to about 10.0 μm and less than or equal to about 300.0 μm. In particular, in the present preferred embodiment, an effect is more exerted on multilayer body 12 having a small dimension in height direction x of multilayer body 12. This is because a mechanical strength of multilayer body 12 decreases as multilayer body 12 has a smaller dimension in height direction x of multilayer body 12.

Further, in particular, a dimension in height direction x connecting first main surface 12*a* and second main surface 12*b* of multilayer body 12 is preferably, for example, less than or equal to about 70 μm.

As illustrated in FIGS. 4 and 5, internal electrode layer includes a first internal electrode layer 16*a* and a second internal electrode layer 16*b*. First internal electrode layer 16*a* and second internal electrode layers 16*b* are alternately laminated with ceramic layer 14 interposed therebetween.

First internal electrode layer 16*a* is disposed on a surface of ceramic layer 14. First internal electrode layer 16*a* includes a first counter electrode portion 18*a* facing second internal electrode layer 16*b*, and a first extraction electrode portion 20*a* located on one end side of first internal electrode layer 16*a* and extending from first counter electrode portion 18*a* to first end surface 12*e* of multilayer body 12. An end portion of first extraction electrode portion 20*a* extends to first end surface 12*e* and exposed.

A shape of first counter electrode portion 18*a* of first internal electrode layer 16*a* is not particularly limited, but is preferably, for example, rectangular or substantially rectangular in plan view. However, a corner portion in plan view may be rounded, or a corner portion may be inclined (tapered) in plan view. In addition, a tapered shape in plan view may be used in which an inclination is made in either direction.

A shape of first extraction electrode portion 20*a* of first internal electrode layer 16*a* is not particularly limited, but is preferably, for example, rectangular or substantially rectangular in plan view. However, a corner portion in plan view may be rounded, or a corner portion may be inclined (tapered) in plan view. In addition, a tapered shape in plan view may be used in which an inclination is made in either direction.

A width of first counter electrode portion 18*a* of first internal electrode layer 16*a* and a width of first extraction electrode portion 20*a* of first internal electrode layer 16*a* may be the same or substantially the same, or either one may have a narrow width.

Second internal electrode layer 16*b* is disposed on a surface of ceramic layer 14 different from ceramic layer 14 on which first internal electrode layer 16*a* is disposed. Second internal electrode layer 16*b* includes a second counter electrode portion 18*b* facing first internal electrode layer 16*a*, and a second extraction electrode portion 20*b* located on one end side of second internal electrode layer 16*b* and extending from second counter electrode portion 18*b* to second end surface 12*f* of multilayer body 12. An end portion of second extraction electrode portion 20*b* extends to second end surface 12*f* and exposed.

A shape of second counter electrode portion 18*b* of second internal electrode layer 16*b* is not particularly limited, but is preferably, for example, rectangular or substantially rectangular in plan view. However, a corner portion in plan view may be rounded, or a corner portion may be inclined (tapered) in plan view. In addition, a tapered shape in plan view may be used in which an inclination is made in either direction.

A shape of second extraction electrode portion 20*b* of second internal electrode layer 16*b* is not particularly limited, but is preferably, for example, rectangular or substantially rectangular in plan view. However, a corner portion in plan view may be rounded, or a corner portion may be inclined (tapered) in plan view. In addition, a tapered shape in plan view may be used in which an inclination is made in either direction.

A width of second counter electrode portion 18*b* of second internal electrode layer 16*b* and a width of second extraction electrode portion 20*b* of second internal electrode layer 16*b* may be the same or substantially the same, or either one may have a narrow width.

Further, as illustrated in FIG. 4, multilayer body 12 includes an end portion (hereinafter, referred to as an "L gap") 22*b* of multilayer body 12 between second end surface 12*f* and an end portion of first internal electrode layer 16*a* opposite to first extraction electrode portion 20*a* and between first end surface 12*e* and an end portion of second internal electrode layer 16*b* opposite to second extraction electrode portion 20*b*.

As illustrated in FIG. 5, multilayer body 12 includes a side portion (hereinafter, referred to as a "W gap") 22*a* of multilayer body 12 between first side surface 12*c* and one end of first counter electrode portion 18*a* and second counter electrode portion 18*b* in width direction y, and between second side surface 12*d* and another end of first counter electrode portion 18*a* and second counter electrode portion 18*b* in width direction y.

First internal electrode layer 16*a* and second internal electrode layer 16*b* can be made by an appropriate conductive material such as, for example, a metal such as Ni, Cu, Ag, Pd, or Au, or an alloy including at least one of these metals, such as an Ag—Pd alloy. Internal electrode layer 16 may further include dielectric particles having the same or substantially the same compositional system as a ceramic included in ceramic layer 14.

In a case where a piezoelectric ceramic is used for multilayer body 12, the multilayer ceramic electronic component defines and functions as a ceramic piezoelectric element 10*a*. Specific examples of a piezoelectric ceramic material include, for example, a lead zirconate titanate (PZT)-based ceramic material and the like.

Further, in a case where a semiconductor ceramic is used for multilayer body 12, the multilayer ceramic electronic component defines and functions as a thermistor element 10*b*. Specific examples of a semiconductor ceramic material include, for example, a spinel-based ceramic material and the like.

Further, in a case where a magnetic ceramic is used for multilayer body 12, the multilayer ceramic electronic component defines and functions as an inductor element 10*c*. Further, in a case of defining and functioning as the inductor element, the internal electrode layer is a coil-shaped conductor. Specific examples of a magnetic ceramic material include, for example, a zero material and the like.

That is, the multilayer ceramic electronic component according to the present preferred embodiment can suitably define and function as not only multilayer ceramic capacitor 10 but also as the ceramic piezoelectric element, the thermistor element, or the inductor element by appropriately changing a material and a structure of multilayer body 12.

A thickness of internal electrode layer 16, that is, a thickness of first internal electrode layer 16*a* and second internal electrode layer 16*b* is preferably, for example, greater than or equal to about 0.2 μm and less than or equal to about 2.0 μm.

The number of first internal electrode layers 16*a* and second internal electrode layers 16*b* is preferably, for example, greater than or equal to 10 and less than or equal to 700 in total.

Internal electrode layer 16 may be provided so as to be parallel or substantially parallel or perpendicular or substantially perpendicular to a surface to be mounted on a mounting substrate, but is more preferably provided so as to be parallel or substantially parallel to the surface to be mounted on the mounting substrate.

As illustrated in FIGS. 1 to 4, external electrode 24 is disposed on first end surface 12*e* side and second end surface 12*f* side of multilayer body 12.

External electrode 24 includes a base electrode layer 26, and a plating layer 28 covering base electrode layer 26.

External electrode 24 includes a first external electrode 24*a* and a second external electrode 24*b*.

First external electrode 24*a* is disposed exclusively on first end surface 12*e* of multilayer body 12, on a portion of first main surface 12*a*, and on a portion of second main surface 12*b*. In this case, first external electrode 24*a* is electrically connected to first extraction electrode portion 20*a* of first internal electrode layer 16*a*. In addition, first external electrode 24*a* is not disposed on a portion of first side surface 12*c* and a portion of second side surface 12*d*, but may extend to some extent.

Second external electrode 24*b* is disposed exclusively on second end surface 12*f* of multilayer body 12, on a portion of first main surface 12*a*, and on a portion of second main surface 12*b*. In this case, second external electrode 24*b* is electrically connected to second extraction electrode portion 20*b* of second internal electrode layer 16*b*. Further, second external electrode 24*b* is not disposed on a portion of first side surface 12*c* and a portion of second side surface 12*d*, but may extend to some extent.

In multilayer body 12, first counter electrode portion 18*a* of first internal electrode layer 16*a* and second counter electrode portion 18*b* of second internal electrode layer 16*b* face each other with ceramic layer 14 interposed therebetween, which generates electrostatic capacitance. Therefore, electrostatic capacitance can be obtained between first external electrode 24*a* connected with first internal electrode layer 16*a* and second external electrode 24*b* connected with second internal electrode layer 16*b*, and characteristics of the capacitor are obtained.

Base electrode layer 26 includes a first base electrode layer 26*a*1, a second base electrode layer 26*a*2, a third base electrode layer 26*b*1, and a fourth base electrode layer 26*b*2. First base electrode layer 26*a*1, second base electrode layer 26*a*2, third base electrode layer 26*b*1, and fourth base electrode layer 26*b*2 are thin film layers including a plurality of thin film electrodes, in order to further improve performance.

First base electrode layer 26*a*1 covers a portion of first main surface 12*a* on first end surface 12*e* side of multilayer body 12. Second base electrode layer 26*a*2 covers a portion of second main surface 12*b* on first end surface 12*e* side of multilayer body 12.

Further, third base electrode layer 26*b*1 covers a portion of first main surface 12*a* on second end surface 12*f* side of multilayer body 12. Fourth base electrode layer 26*b*2 covers a portion of second main surface 12*b* on second end surface 12*f* side of multilayer body 12.

Base electrode layer 26 made of the thin film layer is preferably formed by a thin film forming method such as a sputtering method or a vapor deposition method, for example. In particular, base electrode layer 26 made of the thin film layer is preferably, for example, a sputtering electrode formed by a sputtering method. Hereinafter, an electrode formed by the sputtering method will be described.

When base electrode layer 26 is formed by a sputtering electrode, it is preferable to directly form the sputtering electrode on a portion of first main surface 12*a* and a portion of second main surface 12*b* of multilayer body 12.

Base electrode layer 26 formed by the sputtering electrode includes, for example, at least one selected from Ni, Cr, Cu, Ti, and the like.

A thickness of the sputtering electrode in height direction x connecting first main surface 12*a* and second main surface 12*b* is preferably, for example, greater than or equal to about 50 nm and less than or equal to about 400 nm, and more preferably greater than or equal to about 50 nm and less than or equal to about 130 nm.

Plating layer 28 includes a first plating layer 28*a* and a second plating layer 28*b*.

First plating layer 28*a* covers first base electrode layer 26*a*1 and second base electrode layer 26*a*2.

Second plating layer 28*b* covers third base electrode layer 26*b*1 and fourth base electrode layer 26*b*2.

Plating layer 28 includes a plurality of layers.

Specifically, plating layer 28 includes a lower layer plating layer 30, a middle layer plating layer 32 covering base electrode layer 26 and lower layer plating layer 30, and an upper layer plating layer 34 covering middle layer plating layer 32.

Lower layer plating layer 30 includes a first lower layer plating layer 30*a* and a second lower layer plating layer 30*b*.

First lower layer plating layer 30*a* is disposed exclusively on a surface of first end surface 12*e* of multilayer body 12 on which no base electrode layer is disposed. More specifically, first lower layer plating layer 30*a* is disposed on a surface of multilayer body 12 so as to cover first internal electrode layer 16*a* exposed on first end surface 12*e*. At this time, first lower layer plating layer 30*a* may be disposed so that a portion of the surface of first end surface 12*e* is exposed, or may be disposed so as to cover the entire or substantially the entire surface of first end surface 12*e*.

Second lower layer plating layer 30*b* is disposed exclusively on a surface of second end surface 12*f* of multilayer body 12 on which no base electrode layer is disposed. More specifically, second lower layer plating layer 30*b* is disposed on a surface of multilayer body 12 so as to cover second internal electrode layer 16*b* exposed on second end surface 12*f*. At this time, second lower layer plating layer 30*b* may be disposed so that a portion of the surface of second end surface 12*f* is exposed, or may be disposed so as to cover the entire or substantially the entire surface of second end surface 12*f*.

Lower layer plating layer 30 preferably includes, for example, at least one selected from Cu, Ni, Sn, Ag, Pd, an Ag—Pd alloy, Au, and the like. Among them, lower layer plating layer 30 is preferably a Cu plating layer. This provides an advantageous effect of reducing or preventing entry of a plating solution when upper layer plating layer 34 is formed.

A thickness of lower layer plating layer 30 is preferably, for example, greater than or equal to about 2 μm and less than or equal to about 11 μm.

Middle layer plating layer 32 includes a first middle layer plating layer 32*a* and a second middle layer plating layer 32*b*.

First middle layer plating layer 32*a* is disposed on a surface of first lower layer plating layer 30*a*, a surface of first end surface 12*e* on which first lower layer plating layer 30*a* is not disposed, and surfaces of first base electrode layer 26*a*1 and second base electrode layer 26*a*2. In a case where first lower layer plating layer 30*a* is disposed so as to cover the entire or substantially the entire first end surface 12*e*, first middle layer plating layer 32*a* is disposed on the surfaces of first lower layer plating layer 30*a*, first base electrode layer 26*a*1, and second base electrode layer 26*a*2.

Second middle layer plating layer 32*b* is disposed on a surface of second lower layer plating layer 30*b*, a surface of second end surface 12*f* on which second lower layer plating layer 30*b* is not disposed, and surfaces of third base electrode layer 26*b*1 and fourth base electrode layer 26*b*2. In a case where second lower layer plating layer 30*b* is disposed so as to cover the entire or substantially the entire second end surface 12*f*, second middle layer plating layer 32*b* is disposed on the surfaces of second lower layer plating layer 30*b*, third base electrode layer 26*b*1, and fourth base electrode layer 26*b*2.

Middle layer plating layer 32 preferably includes, for example, at least one selected from Cu, Ni, Sn, Ag, Pd, an Ag—Pd alloy, Au, and the like. Among them, middle layer plating layer 32 is preferably a Cu plating layer. This provides an advantageous effect of reducing or preventing entry of a plating solution when upper layer plating layer 34 is formed.

A thickness of middle layer plating layer 32 is preferably, for example, greater than or equal to about 2 μm and less than or equal to about 11 μm.

Upper layer plating layer 34 includes a first upper layer plating layer 34*a* and a second upper layer plating layer 34*b*.

First upper layer plating layer 34*a* is disposed so as to cover first middle layer plating layer 32*a*. Specifically, first upper layer plating layer 34*a* is disposed on first end surface 12*e* on the surface of first middle layer plating layer 32*a*, and is provided so as to also reach first main surface 12*a* and second main surface 12*b* on the surface of first middle layer plating layer 32*a*.

Second upper layer plating layer 34*b* is disposed so as to cover second middle layer plating layer 32*b*. Specifically, second upper layer plating layer 34*b* is disposed on second end surface 12*f* on the surface of second middle layer plating layer 32*b*, and is provided so as to also reach first main surface 12*a* and second main surface 12*b* on the surface of second middle layer plating layer 32*b*.

Upper layer plating layer 34 preferably includes a single or a plurality of plating layers.

Upper layer plating layer 34 preferably includes, for example, at least one selected from Cu, Ni, Sn, Ag, Pd, an Ag—Pd alloy, Au, and the like.

In the present preferred embodiment, upper layer plating layer 34 has a two-layer structure including an Ni plating layer and an Sn plating layer provided in this order. The Ni plating layer covers a surface of middle layer plating layer 32, which makes it possible to reduce or prevent erosion of base electrode layer 26 and lower layer plating layer 30 due to solder when multilayer ceramic capacitor 10 is mounted on the mounting substrate. By providing the Sn plating layer, wettability of solder when multilayer ceramic capacitor 10 is mounted on the mounting substrate can be improved, and multilayer ceramic capacitor 10 can be easily mounted.

A thickness per layer of upper layer plating layer 34 is preferably, for example, greater than or equal to about 2 μm and less than or equal to about 11 μm.

In the present preferred embodiment, when a sum of a thickness in length direction z of lower layer plating layer 30 and a thickness in length direction z of middle layer plating layer 32 located on first end surface 12*e* is defined as X1, a sum of a thickness in length direction z of lower layer plating layer 30 and a thickness in length direction z of middle layer plating layer 32 located on second end surface 12*f* is defined as X2, a sum of a thickness in height direction x of base electrode layer 26 located on first main surface 12*a* and a thickness in height direction x of middle layer plating layer 32 is defined as Y1, and a sum of a thickness in height direction x of base electrode layer 26 located on second main surface 12*b* and a thickness in height direction x of middle layer plating layer 32 is defined as Y2, a relationship of X1>Y1, X1>Y2, X2>Y1, and X2>Y2 is satisfied.

More specifically, as illustrated in FIG. 6, in first external electrode 24*a*, when a sum of a thickness in length direction z of first lower layer plating layer 30*a* and a thickness in length direction z of first middle layer plating layer 32*a* located on first end surface 12*e* is defined as X1, a sum of a thickness in height direction x of first base electrode layer 26*a*1 and a thickness in height direction x of first middle layer plating layer 32*a* located on first main surface 12*a* is defined as Y11, and a sum of a thickness in height direction x of second base electrode layer 26*a*2 and a thickness in height direction x of first middle layer plating layer 32*a* located on second main surface 12*b* is defined as Y21, a relationship of X1>Y11 and X1>Y21 is satisfied.

Similarly, in second external electrode 24*b*, when a sum of a thickness in length direction z of second lower layer plating layer 30*b* and a thickness in length direction z of second middle layer plating layer 32*b* located on second end surface 12*f* is defined as X2, a sum of a thickness in height direction x of third base electrode layer 26*b*1 and a thickness in height direction x of second middle layer plating layer 32*b* located on first main surface 12*a* is defined as Y12, and a sum of a thickness in height direction x of fourth base electrode layer 26*b*2 and a thickness in height direction x of second middle layer plating layer 32*b* located on second main surface 12*b* is Y22, a relationship of X2>Y12 and X2>Y22 is satisfied.

This makes it possible to reduce a thickness of external electrode 24 with respect to height direction x of multilayer ceramic capacitor 10, and thus the multilayer body can be made as thick as possible within the standard dimensions, and a degree of freedom in designing an effective area of internal electrode layers 16 can be improved. In addition, since plating layer 28 having a sufficient thickness can be secured on both end surfaces 12*e* and 12*f* sides of multilayer body 12 from which internal electrode layers 16 are extracted, moisture entry from outside can be reduced or prevented.

X1, which is a sum of a thickness of first lower layer plating layer 30*a* and a thickness of first middle layer plating layer 32*a* on first end surface 12*e*, is preferably, for example, greater than or equal to about 4 μm and less than or equal to about 12 μm.

X2, which is a sum of a thickness of second lower layer plating layer 30*b* and a thickness of second middle layer plating layer 32*b* on second end surface 12*f*, is preferably, for example, greater than or equal to about 4 μm and less than or equal to about 12 μm.

Y11, which is a sum of a thickness of first base electrode layer 26*a*1 and a thickness of first middle layer plating layer 32*a* on first main surface 12*a*, and Y12, which is a sum of a thickness of second base electrode layer 26*a*2 and a thickness of second middle layer plating layer 32*b* on first main surface 12*a*, are preferably, for example, greater than or equal to about 2 μm and less than or equal to about 10 μm.

Y21, which is a sum of a thickness of first base electrode layer 26*a*1 and a thickness of first middle layer plating layer 32*a* on second main surface 12*b*, and Y22, which is a sum of a thickness of fourth base electrode layer 26*b*2 and a thickness of second middle layer plating layer 32*b* on second main surface 12*b*, are preferably, for example, greater than or equal to about 2 μm and less than or equal to about 10 μm.

Further, a ratio X1/Y11 between X1 and Y11 and a ratio X1/Y21 between X1 and Y21 are preferably, for example, greater than or equal to about 1.5. Similarly, a ratio X2/Y12 between X2 and Y12 and a ratio X2/Y22 between X2 and Y22 are preferably, for example, greater than or equal to about 1.5. This makes it possible to reduce a thickness of external electrode 24 with respect to height direction x of multilayer ceramic capacitor 10, and thus the multilayer body can be made as thick as possible within the standard dimensions, and a degree of freedom in designing an effective area of internal electrode layers 16 can be improved. In addition, since plating layer 28 having a sufficient thickness can be secured on the end surface side of multilayer body 12 from which internal electrode layer 16 is extracted, moisture entry from outside can be reduced or prevented.

A thickness in length direction z of lower layer plating layer 30 located on first end surface 12*e* and second end surface 12*f* is preferably larger than a thickness in length direction z of middle layer plating layer 32 located on first end surface 12*e* and second end surface 12*f*. As a result, a thickness of lower layer plating layer 30 on a side closer to internal electrode layer 16 can be secured, and moisture entry can be further reduced or prevented.

Further, in the present preferred embodiment, on first end surface 12*e* and second end surface 12*f* where internal electrode layers 16 are exposed, a particle diameter of a metal included in lower layer plating layer 30 connected to internal electrode layer 16 is larger than a particle diameter of a metal included in middle layer plating layer 32 disposed on lower layer plating layer 30. As a result, the particle diameter of lower layer plating layer 30 on a side closer to the internal electrode layer is large, and thus the number of grain boundaries can be reduced as compared with a case where the particle diameter is small, so that a path of moisture entry can be reduced. Therefore, moisture entry can be reduced or prevented.

Further, on lower layer plating layer 30, middle layer plating layer 32 including metal having a particle diameter smaller than that of a metal included in lower layer plating layer 30 is disposed. As a result, since the particle diameter of metal particles of middle layer plating layer 32 is small, a compressive stress of middle layer plating layer 32 can be reduced. As a result, even when a thermal stress is applied, it is possible to reduce or prevent a tensile stress applied to a tip end portion of middle layer plating layer 32, and it is possible to reduce or prevent an occurrence of cracks in multilayer body 12 caused by the thermal stress.

A particle diameter of the metal included in lower layer plating layer 30 is preferably, for example, greater than or equal to about 2 μm and less than or equal to about 4 μm, and a particle diameter of the metal included in middle layer plating layer 32 is preferably, for example, greater than or equal to about 0.1 μm and less than or equal to about 2 μm. As a result, the particle diameter of lower layer plating layer 30 on a side closer to the internal electrode layer is large, and thus the number of grain boundaries can be reduced as compared with a case where the particle diameter is small, so that a path of moisture entry can be reduced. Therefore, moisture entry into multilayer ceramic capacitor 10 can be reduced or prevented.

When the particle diameter of the metal included in lower layer plating layer 30 becomes smaller than about 2 μm, the number of paths of moisture increases, which may cause a defect in moisture resistance reliability.

In addition, when the particle diameter of the metal included in middle layer plating layer 32 becomes larger than about 2 μm, a compressive stress increases, a tensile stress applied to the multilayer body becomes strong, and the multilayer body may be cracked by a thermal stress.

Note that the particle diameters of lower layer plating layer 30 and middle layer plating layer 32 can be measured by the following non-limiting example of a measurement method.

That is, first, a cross section of multilayer ceramic capacitor 10 is exposed. Specifically, polishing is performed so as to be parallel or substantially parallel to a side surface until reaching a position of about ½ W of multilayer ceramic capacitor 10. Next, lower layer plating layer 30 and middle layer plating layer 32 in predetermined regions in a central portion of first end surface 12*e* and a central portion of second end surface 12*f* in the polished cross section are measured using an electron microscope. Observation is performed with a magnification at greater than or equal to about 20,000 times at this time. As details of the observation, 10 lines are drawn at equal or substantially equal intervals in height direction (the laminating direction) x of the observed cross section, and a maximum particle diameter of a metal particle diameter on each line is measured for each of lower layer plating layer 30 and middle layer plating layer 32. Finally, in each of lower layer plating layer 30 and middle layer plating layer 32, an average value of the maximum particle diameters measured at 10 lines is taken, and the average value is calculated as the particle diameter.

A dimension in length direction z of multilayer ceramic capacitor 10 including multilayer body 12, first external electrode 24*a*, and second external electrode 24*b* is defined as an L dimension, a dimension in height direction x of multilayer ceramic capacitor 10 including multilayer body 12, first external electrode 24*a*, and second external electrode 24*b* is defined as a T dimension, and a dimension in width direction y of multilayer ceramic capacitor 10 including multilayer body 12, first external electrode 24*a*, and second external electrode 24*b* is defined as a W dimension.

In dimensions of multilayer ceramic capacitor 10, it is preferable that the L dimension in length direction z is, for example, greater than or equal to about 0.126 mm and less than or equal to about 60.0 mm, the W dimension in width direction y is greater than or equal to about 0.10 mm and less than or equal to about 6.0 mm, and the T dimension in height direction x is greater than or equal to about 26 μm and less than or equal to about 300.0 μm.

In multilayer ceramic capacitor 10 illustrated in FIG. 1, when a sum of a thickness in length direction z of lower layer plating layer 30 and a thickness in length direction z of middle layer plating layer 32 located on first end surface 12*e* is defined as X1, a sum of a thickness in length direction z of lower layer plating layer 30 and a thickness in length direction z of middle layer plating layer 32 located on second end surface 12*f* is defined as X2, a sum of a thickness in height direction x of base electrode layer 26 and a thickness in height direction x of middle layer plating layer 32 located on first main surface 12*a* is defined as Y1, and a sum of a thickness in height direction x of base electrode layer 26 and a thickness in height direction x of middle layer plating layer 32 located on second main surface 12*b* is defined as Y2, a relationship of X1>Y1, X1>Y2, X2>Y1, and X2>Y2 is satisfied. This makes it possible to reduce a thickness of external electrode 24 with respect to a thickness direction of multilayer ceramic capacitor 10, and thus multilayer body 12 can be made as thick as possible within the standard dimensions, and a degree of freedom in designing an effective area of internal electrode layer 16 can be improved. In addition, since plating layer 28 having a sufficient thickness can be secured on end surfaces 12*e* and 12*f* sides of multilayer body 12 from which internal electrode layers 16 are extracted, moisture entry from outside can be reduced or prevented.

Further, according to multilayer ceramic capacitor 10 illustrated in FIG. 1, on first end surface 12*e* and second end surface 12*f* where internal electrode layers 16 are exposed, a particle diameter of a metal included in lower layer plating layer connected to internal electrode layer 16 is larger than a particle diameter of a metal included in middle layer plating layer 32 disposed on lower layer plating layer 30. In this way, the particle diameter of lower layer plating layer 30 on a side closer to internal electrode layer 16 is large, and thus the number of grain boundaries can be reduced as compared with a case where the particle diameter is small, so that a path of moisture entry can be reduced. Therefore, moisture entry into multilayer ceramic capacitor 10 can be reduce or prevented.

Further, on lower layer plating layer 30, middle layer plating layer 32 including metal having a particle diameter smaller than that of a metal included in lower layer plating layer 30 is disposed. As a result, since the particle diameter of metal particles constituting middle layer plating layer 32 is small, a compressive stress of middle layer plating layer 32 can be reduced. As a result, even when a thermal stress is applied, it is possible to reduce or prevent a tensile stress applied to a tip end portion of middle layer plating layer 32, and it is possible to reduce or prevent an occurrence of cracks in multilayer body 12 caused by the thermal stress.

From the above, according to multilayer ceramic capacitor 10 illustrated in FIG. 1, it is possible to provide multilayer ceramic capacitor 10 capable of reducing or preventing entry of moisture from outside while sufficiently maintaining a strength of fixing with internal electrode layer 16 a connection portion with internal electrode layer 16 even when external electrode 24 is formed by plating layer 28 at, and having high moisture resistance reliability.

In addition, according to multilayer ceramic capacitor 10 illustrated in FIG. 1, a crack reducing or preventing effect can also be obtained, and both improvement in moisture resistance reliability and improvement in heat-resistant stress can be achieved.

2. Modification of First Preferred Embodiment

Hereinafter, each modification (a first modification and a second modification) of the multilayer ceramic capacitor, which is the multilayer ceramic electronic component according to the first preferred embodiment, will be described. In addition, for each of these modifications, components corresponding to the components of the above-described preferred embodiment are denoted by the same reference numerals, and a detailed description thereof will be omitted.

(1) First Modification

Figure 8:
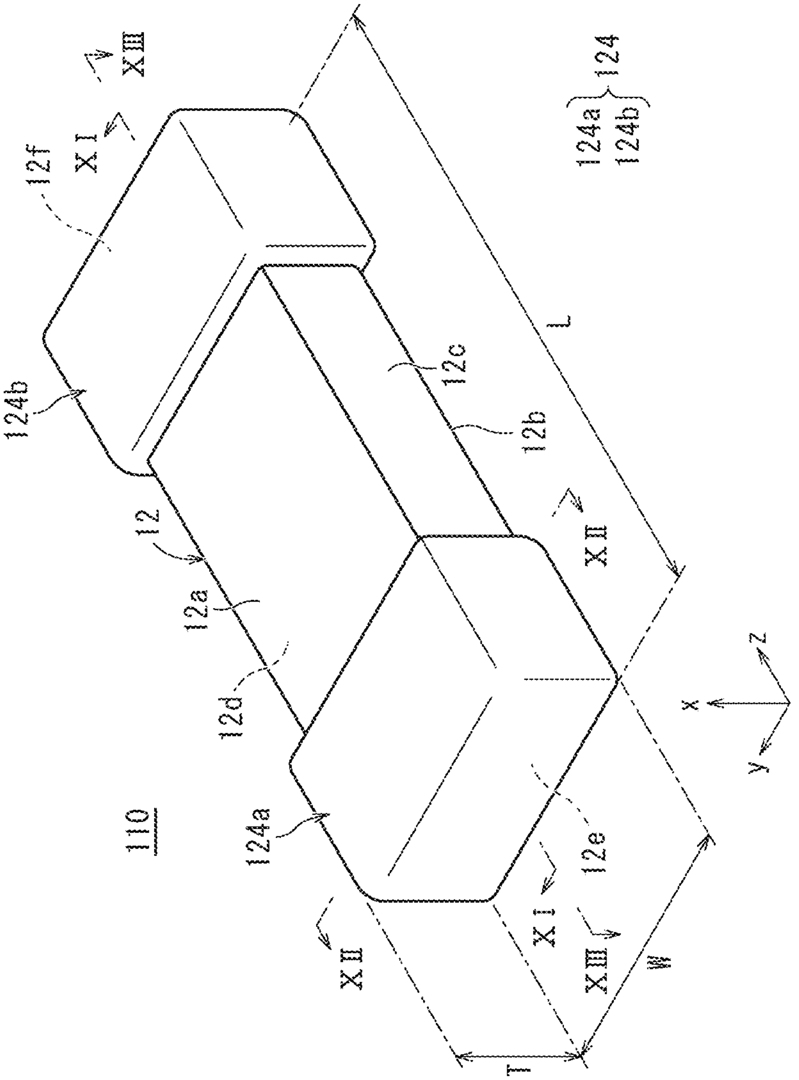
FIG. 8 is an external perspective view illustrating a multilayer ceramic capacitor as an example of a multilayer ceramic electronic component according to a first modification of the first preferred embodiment of the present invention.
Figure 9:
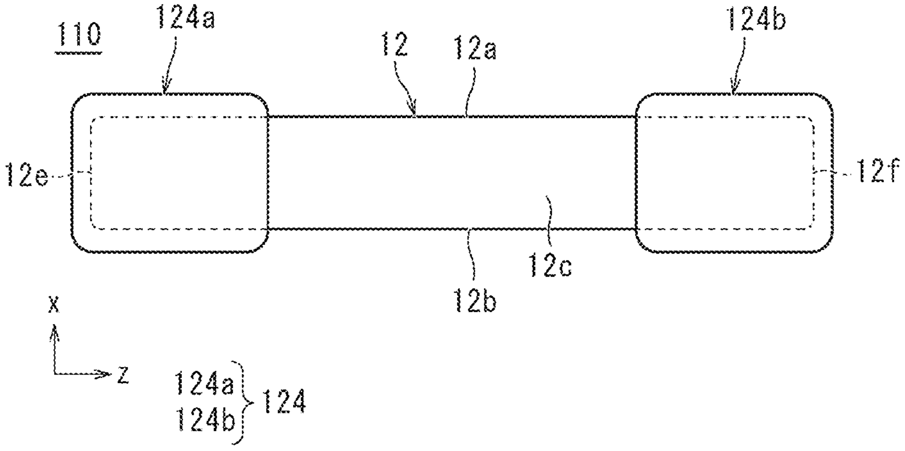
FIG. 9 is a front view illustrating the multilayer ceramic capacitor as an example of the multilayer ceramic electronic component according to the first modification of the first preferred embodiment of the present invention.
Figure 10:
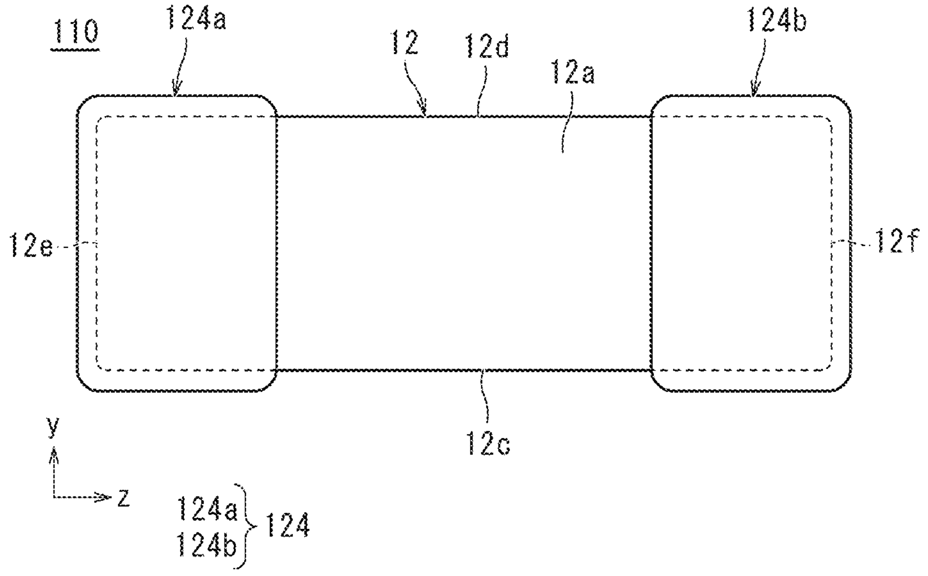
FIG. 10 is a top view illustrating the multilayer ceramic capacitor as an example of the multilayer ceramic electronic component according to the first modification of the first preferred embodiment of the present invention.
Figure 11:
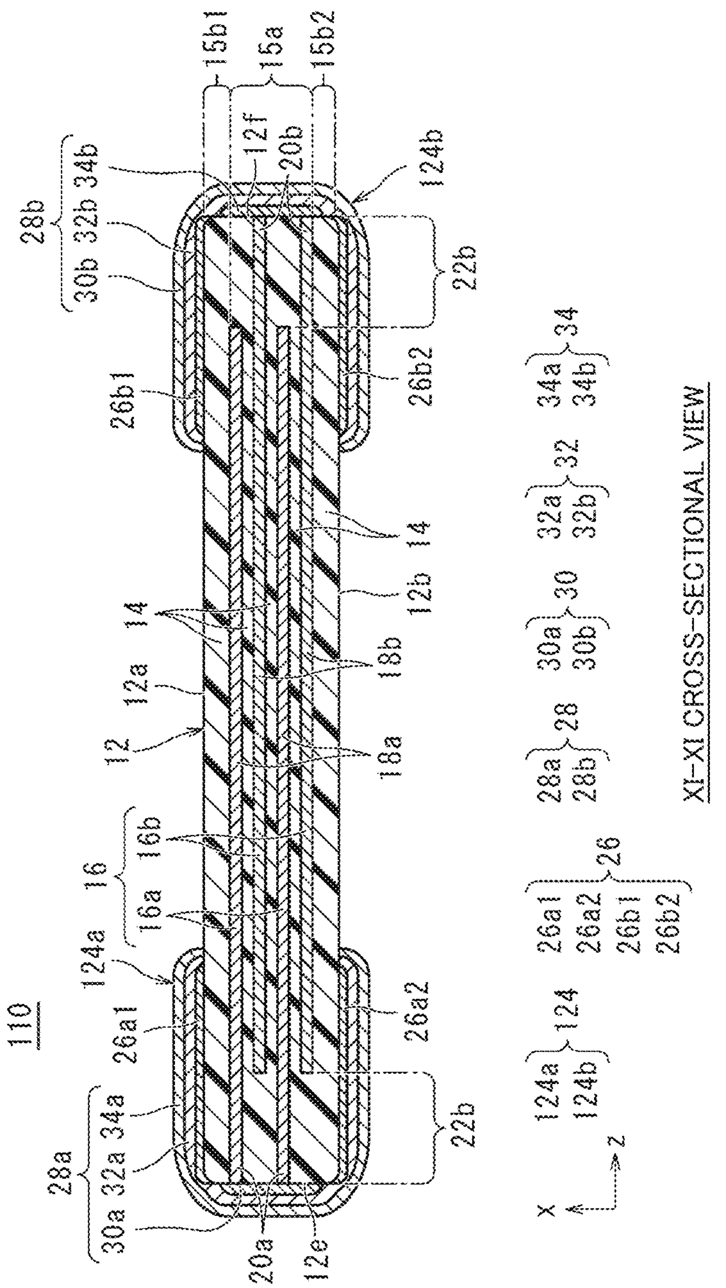
FIG. 11 is a cross-sectional view taken along line XI-XI according to FIG. 1.
Figure 12:
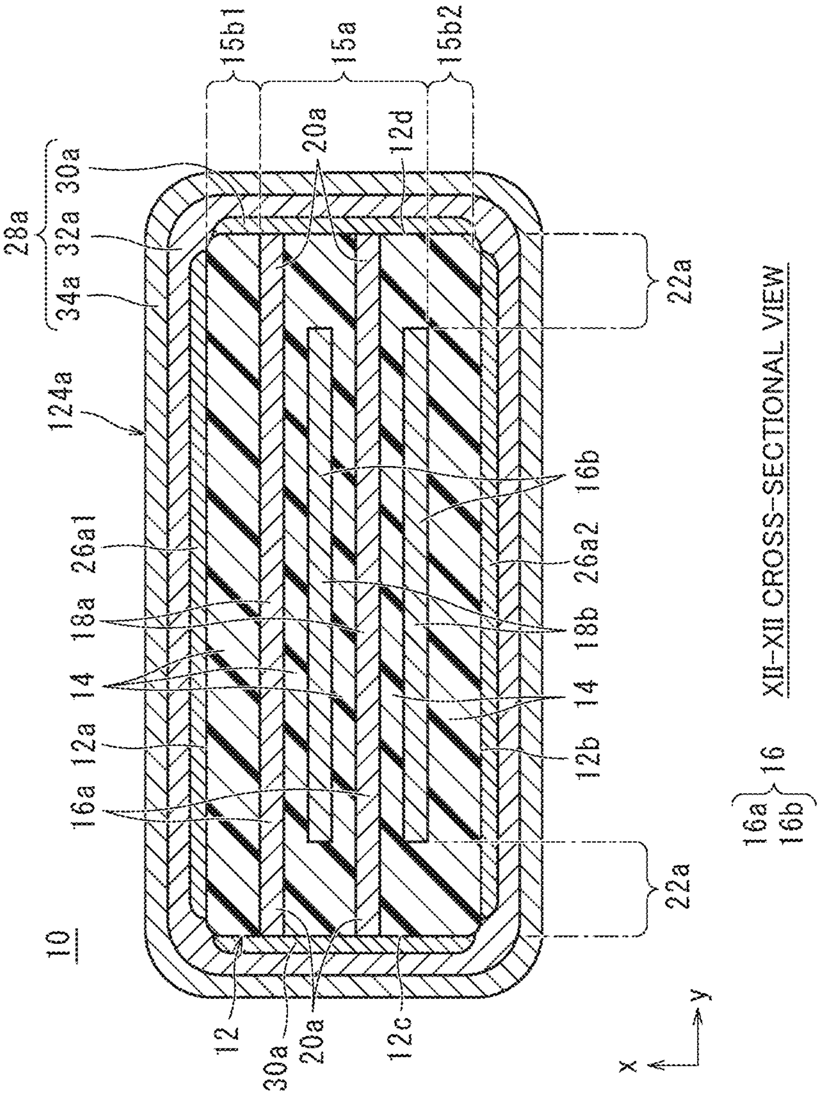
FIG. 12 is a cross-sectional view taken along line XII-XII according to FIG. 1.
Figure 13:
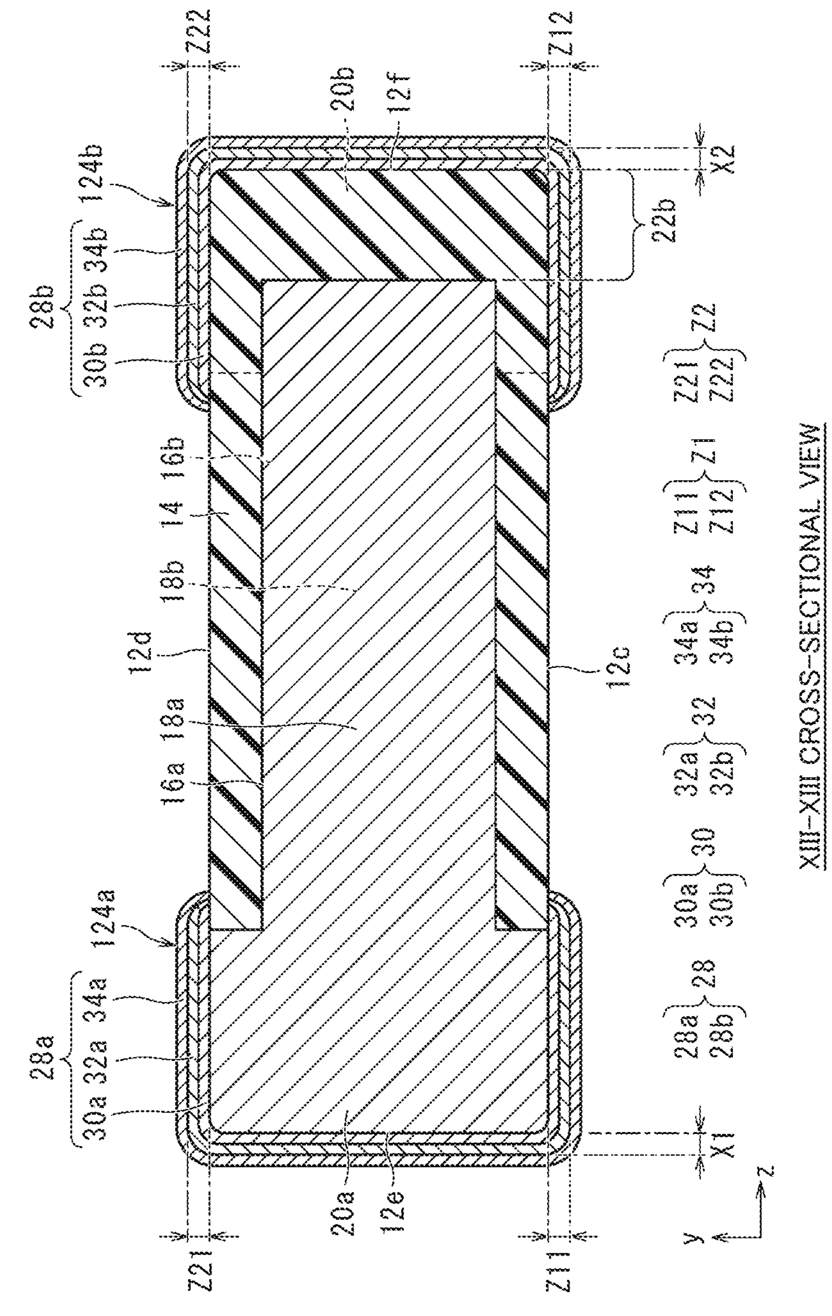
FIG. 13 is a cross-sectional view taken along line XIII-XIII according to FIG. 1.

First, a multilayer ceramic capacitor 110, which is a multilayer ceramic electronic component according to the first modification of the first preferred embodiment, will be described. FIG. 8 is an external perspective view illustrating a multilayer ceramic capacitor as an example of a multilayer ceramic electronic component according to the first modification of the first preferred embodiment of the present invention. FIG. 9 is a front view illustrating the multilayer ceramic capacitor as an example of the multilayer ceramic electronic component according to the first modification of the first preferred embodiment of the present invention. FIG. 10 is a top view illustrating the multilayer ceramic capacitor as an example of the multilayer ceramic electronic component according to the first modification of the first preferred embodiment of the present invention. FIG. 11 is a cross-sectional view taken along line XI-XI according to FIG. 1. FIG. 12 is a cross-sectional view taken along line XII-XII according to FIG. 1. FIG. 13 is a cross-sectional view taken along line XIII-XIII according to FIG. 1.

As illustrated in FIG. 8, in multilayer ceramic capacitor 110 according to the first modification, an external electrode 124 is disposed not only on a first end surface 12*e* and a second end surface 12*f*, and a first main surface 12*a* and a second main surface 12*b*, but also on a first side surface 12*c* and a second side surface 12*d*.

Further, as illustrated in FIG. 13, a shape of an extraction electrode portion of internal electrode layer 16 is also different.

As illustrated in FIGS. 11 and 12, internal electrode layer 16 includes a first internal electrode layer 16*a* and a second internal electrode layer 16*b*. First internal electrode layer 16*a* and second internal electrode layers 16*b* are alternately laminated with a ceramic layer 14 interposed therebetween.

First internal electrode layer 16*a* is disposed on a surface of ceramic layer 14. First internal electrode layer 16*a* includes a first counter electrode portion 18*a* facing second internal electrode layer 16*b*, and a first extraction electrode portion 20*a* located on one end side of first internal electrode layer 16*a* and extending from first counter electrode portion 18*a* to first end surface 12*e* side of multilayer body 12. Then, as illustrated in FIG. 13, an end portion of first extraction electrode portion 20*a* extends to first end surface 12*e*, a portion of first side surface 12*c*, and a portion of second side surface 12*d*, and is exposed.

Second internal electrode layer 16*b* is disposed on a surface of ceramic layer 14 different from ceramic layer 14 on which first internal electrode layer 16*a* is disposed. Second internal electrode layer 16*b* includes a second counter electrode portion 18*b* facing first internal electrode layer 16*a*, and a second extraction electrode portion 20*b* located on one end side of second internal electrode layer 16*b* and extending from second counter electrode portion 18*b* to second end surface 12*f* side of multilayer body 12. Then, as illustrated in FIG. 13, an end portion of second extraction electrode portion 20*b* extends to second end surface 12*f*, a portion of first side surface 12*c*, and a portion of second side surface 12*d*, and is exposed.

External electrode 124 includes a base electrode layer 26, and a plating layer 28 covering base electrode layer 26.

External electrode 124 includes a first external electrode 124*a* and a second external electrode 124*b*.

First external electrode 124*a* is disposed on a surface of first end surface 12*e* of multilayer body 12, on a portion of first main surface 12*a* and a portion of second main surface 12*b*, and on a portion of first side surface 12*c* and a portion of second side surface 12*d*. In this case, first external electrode 124*a* is electrically connected to first extraction electrode portion 20*a* of first internal electrode layer 16*a*.

Second external electrode 124*b* is disposed on a surface of second end surface 12*f* of multilayer body 12, on a portion of first main surface 12*a* and a portion of second main surface 12*b*, and on a portion of first side surface 12*c* and a portion of second side surface 12*d*. In this case, second external electrode 124*b* is electrically connected to second extraction electrode portion 20*b* of second internal electrode layer 16*b*.

Base electrode layer 26 includes a first base electrode layer **26*a*1, a second base electrode layer 26*a*2, a third base electrode layer 26*b*1, and a fourth base electrode layer 26*b*2. First base electrode layer 26*a*1, second base electrode layer 26*a*2, third base electrode layer 26*b*1, and fourth base electrode layer 26*b*2** are thin film layers including a plurality of thin film electrodes, in order to further improve performance.

Plating layer 28 includes a first plating layer **28*a* and a second plating layer 28*b***.

First plating layer **28*a* is disposed so as to cover first base electrode layer 26*a*1 and second base electrode layer 26*a*2**.

Second plating layer **28*b* is disposed so as to cover third base electrode layer 26*b*1 and fourth base electrode layer 26*b*2**.

Plating layer 28 includes a plurality of layers.

Specifically, plating layer 28 includes a lower layer plating layer 30, a middle layer plating layer 32 covering base electrode layer 26 and lower layer plating layer 30, and an upper layer plating layer 34 covering middle layer plating layer 32.

Lower layer plating layer 30 includes a first lower layer plating layer **30*a* and a second lower layer plating layer 30*b***.

First lower layer plating layer **30*a* is disposed exclusively on a surface of first end surface 12*e* of multilayer body 12 on which no base electrode layer is disposed, and surfaces of first side surface 12*c* and second side surface 12*d* so as to extend from first end surface 12*e*. More specifically, first lower layer plating layer 30*a* is disposed on a surface of multilayer body 12 so as to cover first end surface 12*e* and first internal electrode layer 16*a* exposed on first side surface 12*c* and second side surface 12*d*. At this time, first lower layer plating layer 30*a* may be disposed so that a portion of the surface of first end surface 12*e* is exposed, or may cover the entire or substantially the entire surface of first end surface 12*e***.

Second lower layer plating layer **30*b* is disposed exclusively on a surface of second end surface 12*f* of multilayer body 12 on which no base electrode layer is disposed and surfaces of first side surface 12*c* and second side surface 12*d* so as to extend from second end surface 12*f*. More specifically, second lower layer plating layer 30*b* is disposed on a surface of multilayer body 12 so as to cover second end surface 12*f* and second internal electrode layer 16*b* exposed on first side surface 12*c* and the second side surface 12*d*. At this time, second lower layer plating layer 30*b* may be disposed so that a portion of the surface of second end surface 12*f* is exposed, or may cover the entire or substantially the entire surface of second end surface 12*f***.

Middle layer plating layer 32 includes a first middle layer plating layer **32*a* and a second middle layer plating layer 32*b***.

First middle layer plating layer **32*a* is disposed on a surface of first lower layer plating layer 30*a* to extend from first end surface 12*e* to first side surface 12*c* and second side surface 12*d*, surfaces of first side surface 12*c* and second side surface 12*d* on which first lower layer plating layer 30*a* is not disposed, and surfaces of first base electrode layer 26*a*1 and second base electrode layer 26*a*2**.

Second middle layer plating layer **32*b* is disposed on a surface of second lower layer plating layer 30*b* to extend from second end surface 12*f* to first side surface 12*c* and second side surface 12*d*, surfaces of first side surface 12*c* and second side surface 12*d* on which second lower layer plating layer 30*b* is not disposed, and surfaces of third base electrode layer 26*b*1 and fourth base electrode layer 26*b*2**.

Upper layer plating layer 34 includes a first upper layer plating layer **34*a* and a second upper layer plating layer 34*b***.

First upper layer plating layer **34*a* covers first middle layer plating layer 32*a*. Specifically, first upper layer plating layer 34*a* is disposed on first end surface 12*e* on the surface of first middle layer plating layer 32*a*, and extends to second main surface 12*b* on the surface of first middle layer plating layer 32*a*, and extends to first side surface 12*c* and second side surface 12*d***.

Second upper layer plating layer **34*b* covers second middle layer plating layer 32*b*. Specifically, second upper layer plating layer 34*b* is disposed on second end surface 12*f* on the surface of second middle layer plating layer 32*b*, and is provided so as to also extend to first main surface 12*a* and second main surface 12*b* of second middle layer plating layer 32*b*, and extend to first side surface 12*c* and second side surface 12*d***.

Also in multilayer ceramic capacitor 110 according to the first modification, when a sum of a thickness in length direction z of lower layer plating layer 30 and a thickness in length direction z of middle layer plating layer 32 located on first end surface **12*e* is defined as X1, a sum of a thickness in length direction z of lower layer plating layer 30 and a thickness in length direction z of middle layer plating layer 32 located on second end surface 12*f* is defined as X2, a sum of a thickness in height direction x of base electrode layer 26 and a thickness in height direction x of middle layer plating layer 32 located on first main surface 12*a* is defined as Y1, and a sum of a thickness in height direction x of base electrode layer 26 and a thickness in height direction x of middle layer plating layer 32 located on second main surface 12*b*** is defined as Y2, a relationship of X1>Y1, X1>Y2, X2>Y1, and X2>Y2 is satisfied.

Further, as illustrated in FIG. 13, when a sum of a thickness in width direction y of lower layer plating layer 30 and a thickness in width direction y of middle layer plating layer 32 located on first side surface **12*c* is defined as Z1, and a sum of a thickness in width direction y of lower layer plating layer 30 and a thickness in width direction y of middle layer plating layer located on second side surface 12*d*** is defined as Z2, a relationship of X1>Z1, X1>Z2, X2>Z1, and X2>Z2 is preferably satisfied.

More specifically, as illustrated in FIG. 13, in first external electrode **124*a*, when a sum of a thickness in width direction y of first lower layer plating layer 30*a* and a thickness in a width direction x of first middle layer plating layer 32*a* located on first side surface 12*c* is defined as Z11, and a sum of a thickness in width direction y of first lower layer plating layer 30*a* and a thickness in width direction y of first middle layer plating layer 32*a* located on second side surface 12*d*** is defined as Z21, a relationship of 1>Z11 and X1>Z21 is preferably satisfied.

Similarly, in second external electrode **124*b*, when a sum of a thickness in width direction y of second lower layer plating layer 30*b* and a thickness in width direction y of second middle layer plating layer 32*b* located on first side surface 12*c* is defined as Z12, and a sum of a thickness in width direction y of second lower layer plating layer 30*b* and a thickness in width direction y of second middle layer plating layer 32*b* located on second side surface 12*d*** is defined as Z22, a relationship of X2>Z12 and X2>Z22 is preferably satisfied.

Further, a particle diameter of a metal included in lower layer plating layer 30 is preferably larger than a particle diameter of a metal included in middle layer plating layer 32.

According to multilayer ceramic capacitor 110 according to the first modification illustrated in FIG. 8, advantageous effects the same as or similar to those of multilayer ceramic capacitor 10 in FIG. 1 are obtained.

(2) Second Modification

Figure 14:
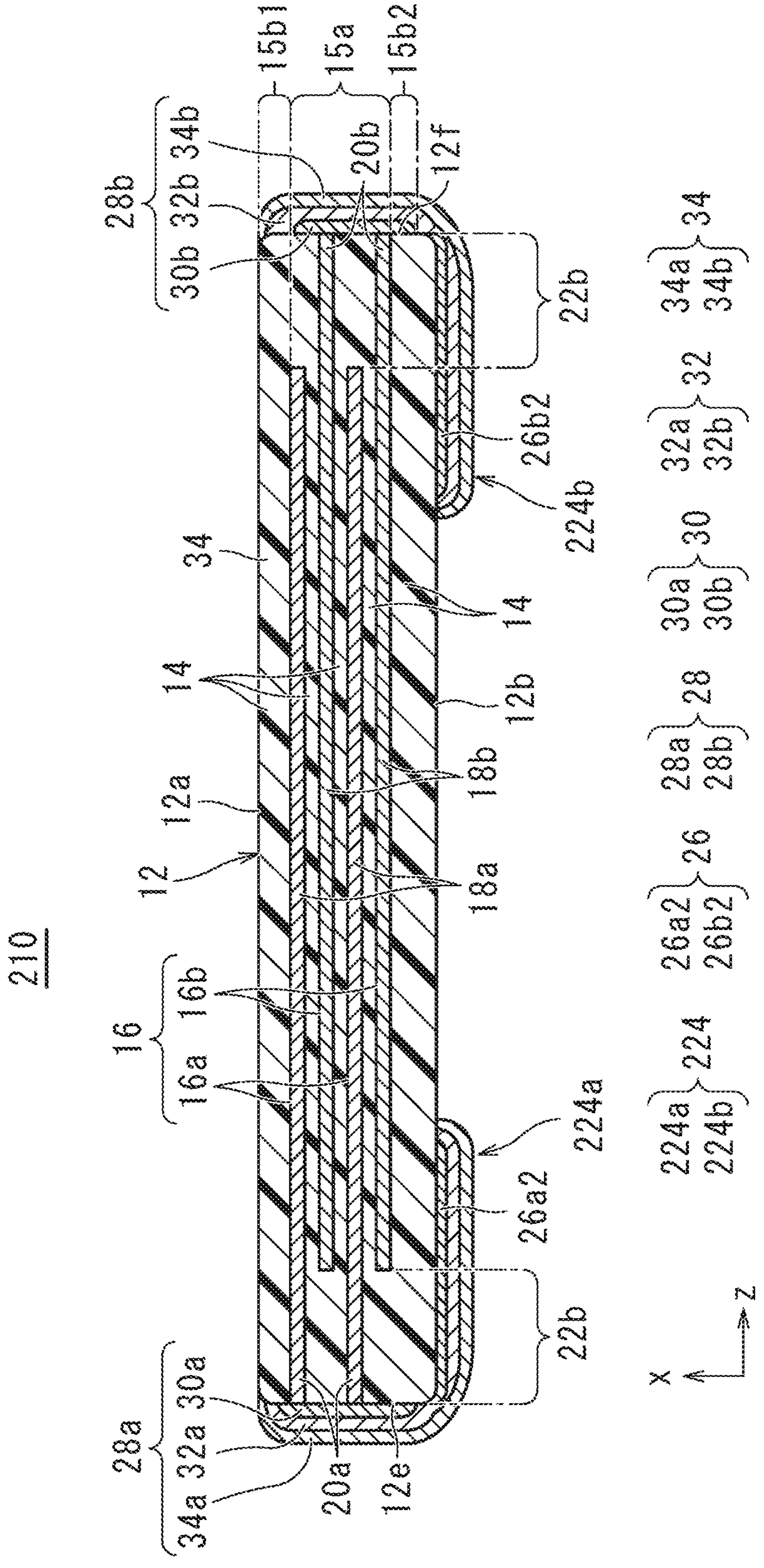
FIG. 14 is a central front cross-sectional view illustrating a multilayer ceramic capacitor as an example of a multilayer ceramic electronic component according to a second modification of the first preferred embodiment of the present invention.

Next, a multilayer ceramic capacitor 210, which is a multilayer ceramic electronic component according to the second modification, will be described. FIG. 14 is a central front cross-sectional view illustrating a multilayer ceramic capacitor as an example of a multilayer ceramic electronic component according to a second modification of the present preferred embodiment of the present invention.

Multilayer ceramic capacitor 210 according to the second modification includes an external electrode 224 having an L-shape in cross-sectional view as illustrated in FIG. 14.

External electrode 224 includes a first external electrode 224*a* and a second external electrode 224*b*.

In multilayer ceramic capacitor 210, which is a multilayer ceramic electronic component according to the second modification, as illustrated in FIG. 14, first external electrode 224*a* having an L-shape in cross-sectional view is disposed on a surface of a first end surface 12*e*, and extends from first end surface 12*e* to be disposed on a second main surface 12*b*. At this time, first external electrode 224*a* may be disposed so as to partially extend to first main surface 12*a*.

Further, in multilayer ceramic capacitor 210, as illustrated in FIG. 14, second external electrode 224*b* having an L-shape in cross-sectional view is disposed on a surface of a second end surface 12*f*, and extends from second end surface 12*f* to be disposed on second main surface 12*b*. At this time, second external electrode 224*b* may be disposed so as to partially extend to first main surface 12*a*.

Therefore, in multilayer ceramic capacitor 210, a second base electrode layer 26*a*2 and a fourth base electrode layer 26*b*2 are disposed on second main surface 12*b*.

Note that first external electrode 224*a* may be disposed on the surface of first end surface 12*e* and extend from first end surface 12*e* to be disposed on first main surface 12*a*, and second external electrode 224*b* may be disposed on the surface of second end surface 12*f* and extend from second end surface 12*f* to be disposed on first main surface 12*a*. At this time, first external electrode 224*a* may be disposed so as to partially extend to second main surface 12*b*, and second external electrode 224*b* may be disposed so as to partially extend to second main surface 12*b*. In this case, on first main surface 12*a*, a first base electrode layer and a third base electrode layer are exclusively disposed.

Plating layer 28 includes a first plating layer 28*a* and a second plating layer 28*b*.

First plating layer 28*a* covers second base electrode layer 26*a*2.

Second plating layer 28*b* covers fourth base electrode layer 26*b*2.

Plating layer 28 includes a plurality of layers.

Specifically, plating layer 28 includes a lower layer plating layer 30, a middle layer plating layer 32 covering base electrode layer 26 and lower layer plating layer 30, and an upper layer plating layer 34 covering middle layer plating layer 32.

Lower layer plating layer 30 includes a first lower layer plating layer 30*a* and a second lower layer plating layer 30*b*.

First lower layer plating layer 30*a* is disposed exclusively on a surface of first end surface 12*e* of multilayer body 12 on which no base electrode layer is disposed. More specifically, first lower layer plating layer 30*a* is disposed on a surface of multilayer body 12 so as to cover a first internal electrode layer 16*a* exposed on first end surface 12*e*. At this time, first lower layer plating layer 30*a* may be disposed so that a portion of the surface of first end surface 12*e* is exposed, or may cover the entire or substantially the entire surface of first end surface 12*e*.

Second lower layer plating layer 30*b* is disposed exclusively on a surface of second end surface 12*f* of multilayer body 12 on which no base electrode layer is disposed. More specifically, second lower layer plating layer 30*b* is disposed on a surface of multilayer body 12 so as to cover a second internal electrode layer 16*b* exposed on second end surface 12*f*. At this time, second lower layer plating layer 30*b* may be disposed so that a portion of the surface of second end surface 12*f* is exposed, or may cover the entire or substantially the entire surface of second end surface 12*f*.

Middle layer plating layer 32 includes a first middle layer plating layer 32*a* and a second middle layer plating layer 32*b*.

First middle layer plating layer 32*a* is disposed on a surface of first lower layer plating layer 30*a*, a surface of first end surface 12*e* on which first lower layer plating layer 30*a* is not disposed, and a surface of second base electrode layer 26*a*2. In a case where first lower layer plating layer 30*a* covers the entire or substantially the entire first end surface 12*e*, first middle layer plating layer 32*a* is disposed on the surfaces of first lower layer plating layer 30*a* and second base electrode layer 26*a*2.

Second middle layer plating layer 32*b* is disposed on a surface of second lower layer plating layer 30*b*, a surface of second end surface 12*f* on which second lower layer plating layer 30*b* is not disposed, and a surface of fourth base electrode layer 26*b*2. In a case where second lower layer plating layer 30*b* covers the entire second end surface 12*f*, second middle layer plating layer 32*b* is disposed on the surfaces of second lower layer plating layer 30*b*, and fourth base electrode layer 26*b*2.

Upper layer plating layer 34 includes a first upper layer plating layer 34*a* and a second upper layer plating layer 34*b*.

First upper layer plating layer 34*a* covers first middle layer plating layer 32*a*. Specifically, first upper layer plating layer 34*a* is disposed on first end surface 12*e* on the surface of first middle layer plating layer 32*a*, and is provided so as to also extend to second main surface 12*b* on the surface of first middle layer plating layer 32*a*.

Second upper layer plating layer 34*b* covers second middle layer plating layer 32*b*. Specifically, second upper layer plating layer 34*b* is disposed on second end surface 12*f* on the surface of second middle layer plating layer 32*b*, and is provided so as to also extend to second main surface 12*b* on the surface of second middle layer plating layer 32*b*.

According to multilayer ceramic capacitor 210 according to the second modification illustrated in FIG. 14, advantageous effects the same as or similar to those of multilayer ceramic capacitor 10 in FIG. 1 are obtained, and the following advantageous effect is also obtained. That is, since external electrode 224 is not provided on the surface of first main surface 12*a*, a thickness of multilayer body 12 can be increased by the absence of the thickness, and electrostatic capacitance per volume of multilayer ceramic capacitor 210 can be improved. In addition, since it is possible to reduce or prevent wetting up of solder on an upper surface (first main surface 12*a*) of multilayer ceramic capacitor 210 at a time of mounting, a thickness of multilayer body 12 can be further increased accordingly.

3. Method for Manufacturing Multilayer Ceramic Capacitor

Hereinafter, a non-limiting example of a method for manufacturing a multilayer ceramic capacitor as an example of the multilayer ceramic electronic component according to the first preferred embodiment will be described.

First, a ceramic green sheet and a conductive paste for internal electrodes are prepared. A dielectric sheet and a conductive paste for internal electrode layers include a binder (for example, a known organic binder) and a solvent (for example, a known organic solvent).

Next, the conductive paste for internal electrodes is printed on the ceramic green sheet in a predetermined pattern by, for example, screen printing or gravure printing, to form an internal electrode pattern. Specifically, a conductive paste layer is formed by applying a paste made by a conductive material onto the ceramic green sheet by a method such as the above-described printing method. The paste made by the conductive material is, for example, obtained by adding an organic binder and an organic solvent to metal powder. Note that, as for the ceramic green sheet, a ceramic green sheet for outer layers on which no internal electrode pattern is printed is also produced.

By using these ceramic green sheets on which the internal electrode pattern is formed, a multilayer sheet is produced. That is, by laminating a predetermined number of ceramic green sheets for outer layers on which no internal electrode pattern is formed, alternately laminating, on top of that, a ceramic green sheet on which an internal electrode pattern corresponding to first internal electrode layer 16*a* is formed and a ceramic green sheet on which an internal electrode pattern corresponding to second internal electrode layer 16*b* is formed, and further laminating, on top of that, a predetermined number of ceramic green sheets for outer layers on which no internal electrode pattern is formed, a multilayer sheet is produced.

Further, a multilayer block is produced by pressing the multilayer sheet in a laminating direction by, for example, isostatic pressing.

Subsequently, the multilayer block is cut into a predetermined size, and a multilayer chip is cut out. At this time, corner portions and ridge portions of the multilayer chip may be rounded by, for example, barrel polishing or the like.

Next, multilayer body 12 is produced by baking the multilayer chip. A baking temperature is preferably, for example, greater than or equal to about 900° C. and less than or equal to about 1400° C., depending on a material of the ceramic or the internal electrode.

Subsequently, base electrode layer 26 made by a thin film layer is formed on a portion of first main surface 12*a* and a portion of second main surface 12*b* of multilayer body 12. Base electrode layer 26 as a thin film layer can be formed by, for example, a sputtering method or the like. In other words, base electrode layer 26 as a thin film layer includes a sputtering electrode. The sputtering electrode can be formed by metal including, for example, at least one selected from Ni, Cr, Cu, Ti, and the like.

Thereafter, on first end surface 12*e* and second end surface 12*f* of multilayer body 12, lower layer plating layer 30 is formed so as to cover a region where internal electrode layer 16 is exposed. Here, for lower layer plating layer 30, by, for example, electrolytic plating using an electrolytic plating bath to which an additive is added or electroless plating by a substitution reaction, lower layer plating layer 30 is formed. As the additive used for the electrolytic plating with the electrolytic plating bath, for example, a citric acid-based additive is used. In addition, a thickness of lower layer plating layer 30 and a particle diameter of a metal of lower layer plating layer 30 of a preferred embodiment of the present invention can be formed by changing plating conditions and performing heat treatment after forming lower layer plating layer 30. The plating conditions are, for example, a bath temperature, a bath ion concentration, and a current density in a case of electrolytic plating. As a condition for the heat treatment, it is preferable to perform the heat treatment in a range of, for example, greater than or equal to about 300° C. and less than or equal to about 900° C. for greater than or equal to about 0.5 hours and less than or equal to about 12 hours.

Subsequently, middle layer plating layer 32 is formed on lower layer plating layer 30, on first end surface 12*e* and second end surface 12*f* on which lower layer plating layer 30 is not disposed, and on base electrode layer 26. For middle layer plating layer 32, by, for example electrolytic plating using an electrolytic plating bath to which an additive is added or electroless plating by a substitution reaction, middle layer plating layer 32 is formed. As the additive used for the electrolytic plating with the electrolytic plating bath, for example, a citric acid-based additive is used. As the additive used for the electrolytic plating with the electrolytic plating bath, for example, a citric acid-based additive is used. Further, by changing plating conditions, a thickness of middle layer plating layer 32 and a particle diameter of a metal of middle layer plating layer 32 of the present invention can be formed. The plating conditions are, for example, a bath temperature, a bath ion concentration, and a current density in a case of electrolytic plating.

Thereafter, upper layer plating layer 34 is formed on a surface of middle layer plating layer 32. Upper layer plating layer 34 includes, for example, at least one selected from Cu, Ni, Sn, Ag, Pd, an Ag—Pd alloy, Au, and the like, and is formed by a single layer or a plurality of layers. Preferably, for example, upper layer plating layer 34 is formed by two layers by forming an Ni plating layer and an Sn plating layer on the Ni plating layer.

As described above, multilayer ceramic capacitor 10 illustrated in FIG. 1 can be manufactured.

According to the method for manufacturing a multilayer ceramic capacitor according to the present preferred embodiment described above, the multilayer ceramic capacitor according to the present invention having high performance can be manufactured with high quality.

B. Second Preferred Embodiment

1. Multilayer Ceramic Capacitor

Figure 15:
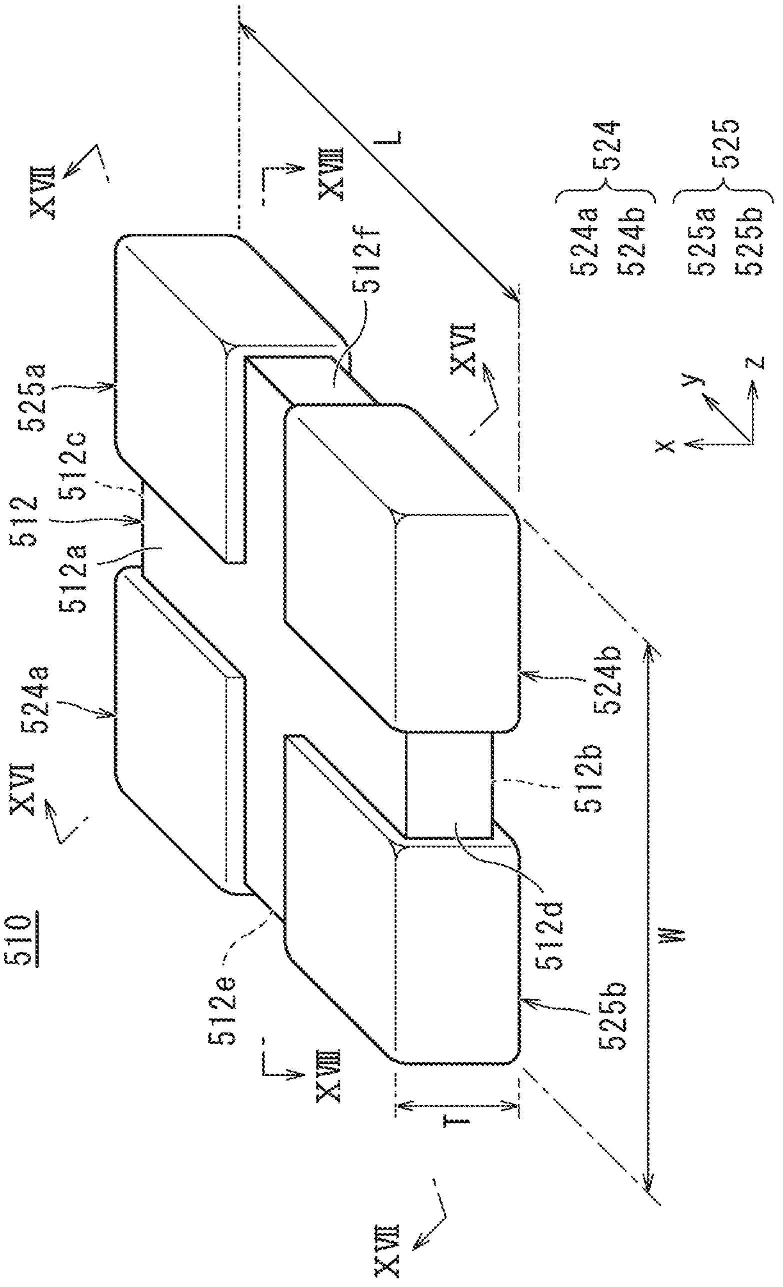
FIG. 15 is an external perspective view illustrating a multilayer ceramic capacitor as an example of a multilayer ceramic electronic component according to a second preferred embodiment of the present invention.
Figure 16:
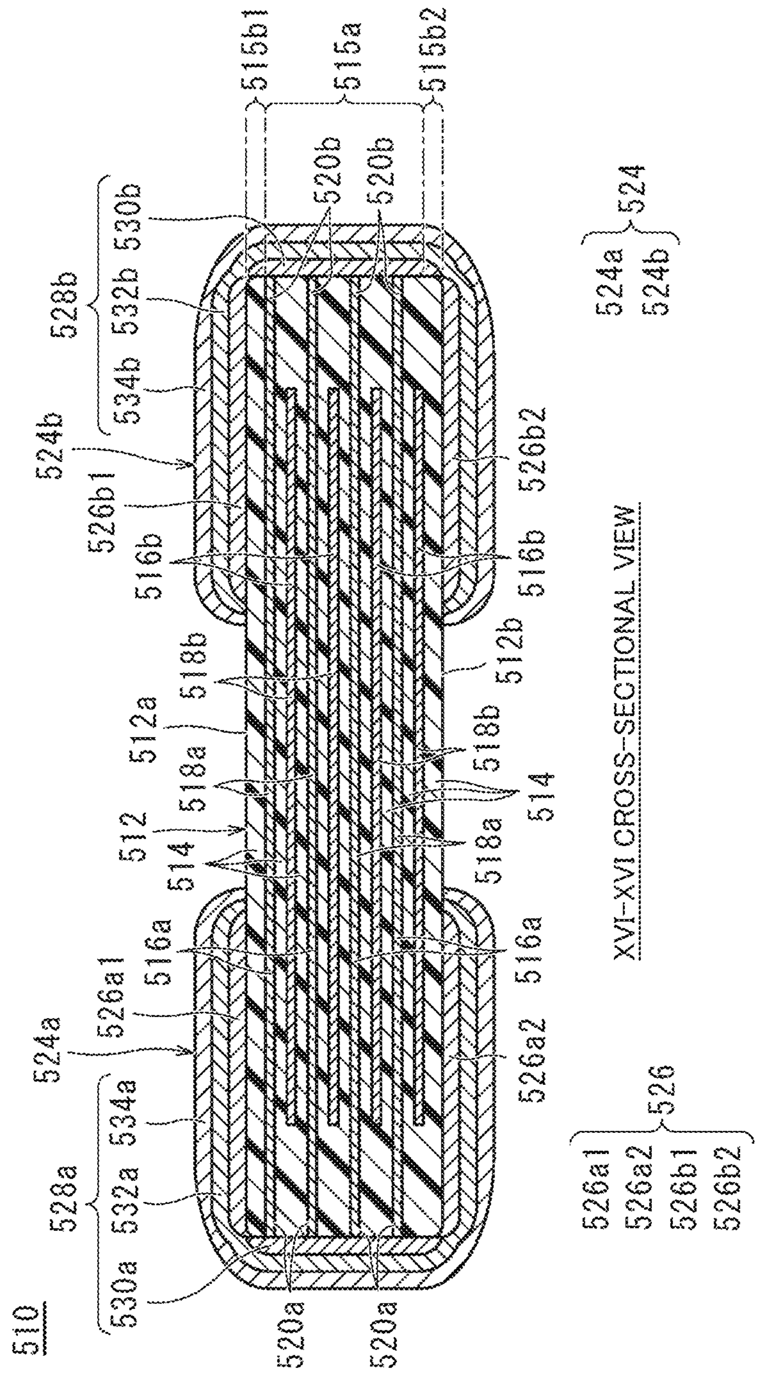
FIG. 16 is a cross-sectional view taken along line XVI-XVI according to FIG. 15.
Figure 17:
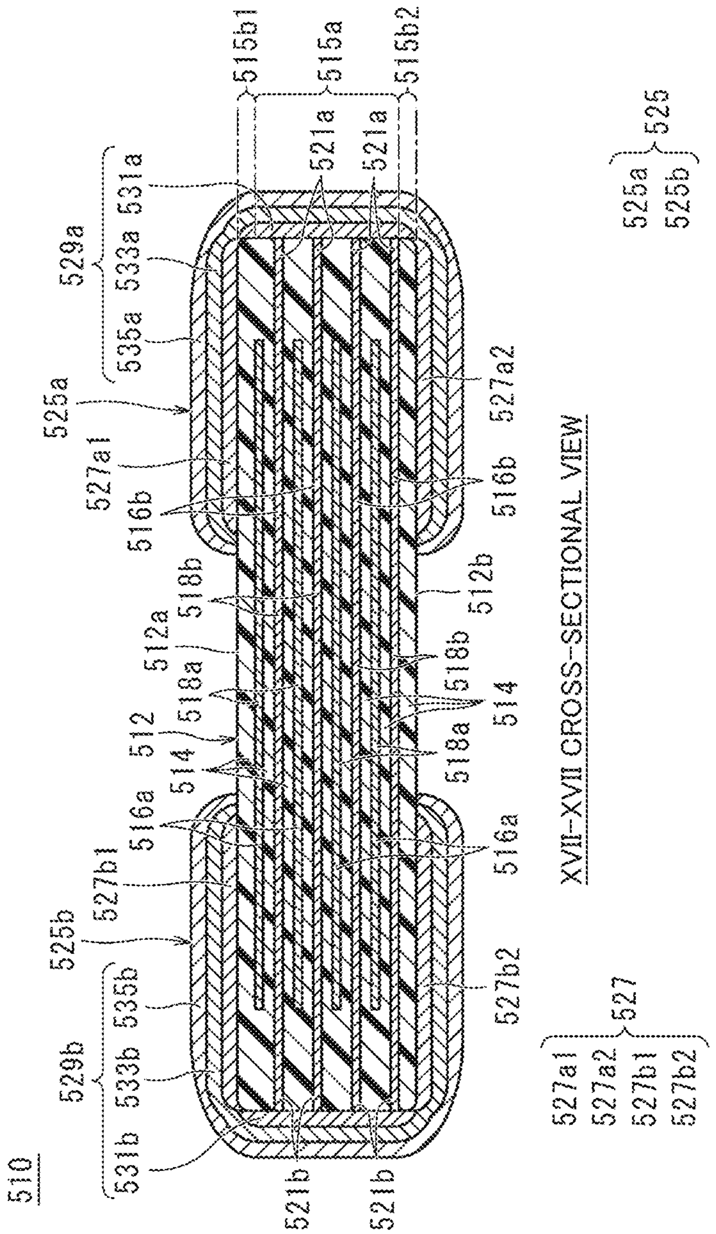
FIG. 17 is a cross-sectional view taken along line XVII-XVII according to FIG. 15.
Figure 18:
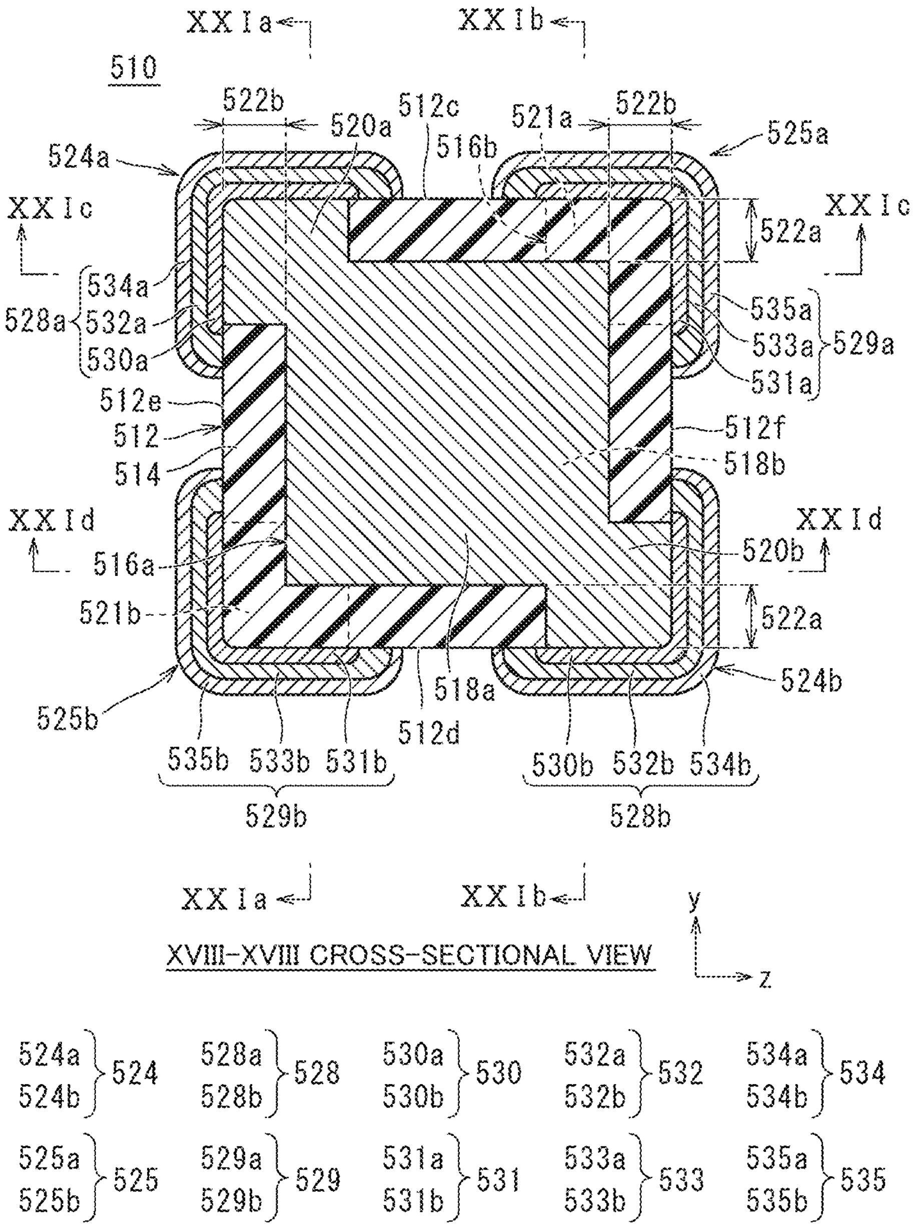
FIG. 18 is a cross-sectional view taken along line XVIII-XVIII according to FIG. 15.
Figure 19:
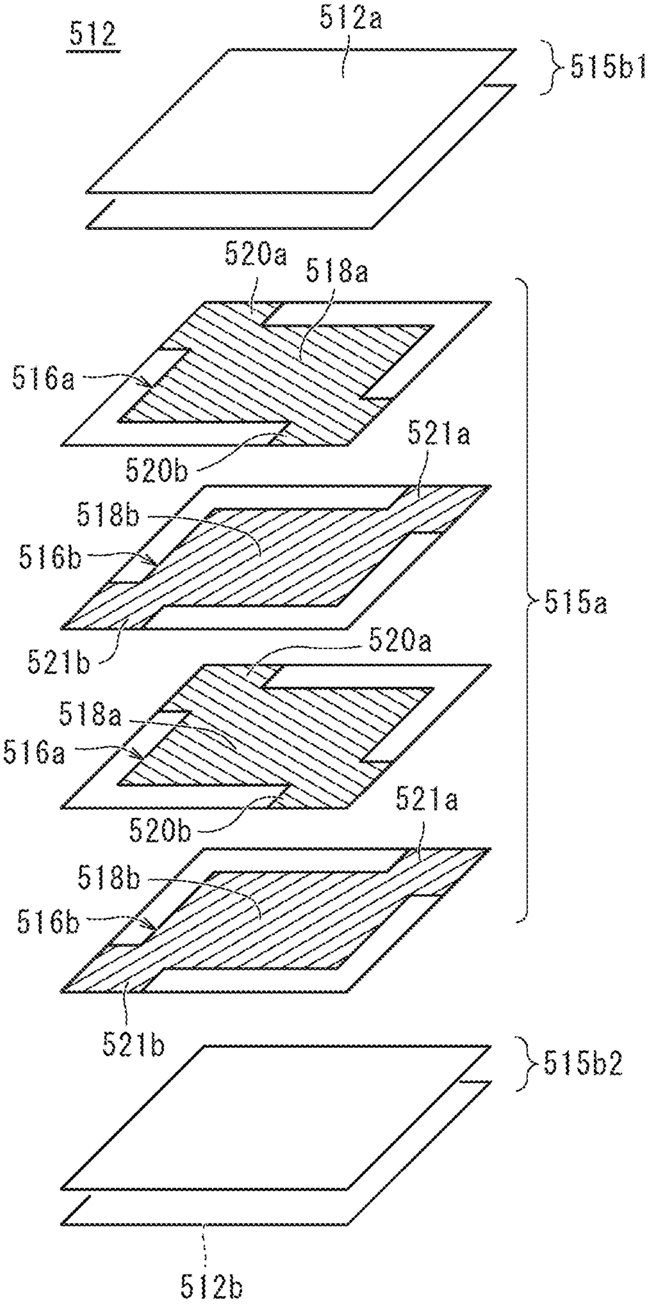
FIG. 19 is an exploded perspective view of a multilayer body illustrated in FIG. 15.
Figure 20A:
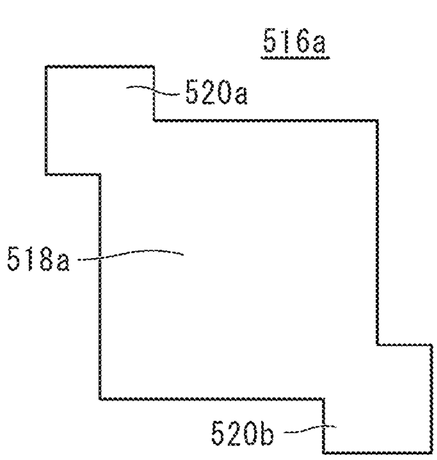
FIG. 20A is a view illustrating a first internal electrode pattern of the multilayer ceramic capacitor illustrated in FIG. 15.
Figure 20B:
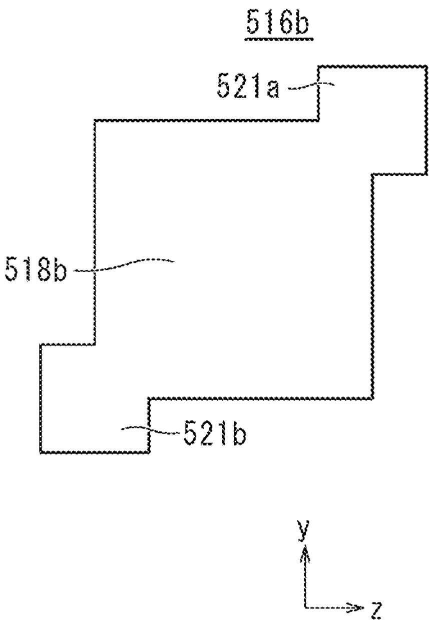
FIG. 20B is a view illustrating a second internal electrode pattern of the multilayer ceramic capacitor illustrated in FIG. 15.
Figure 21A:
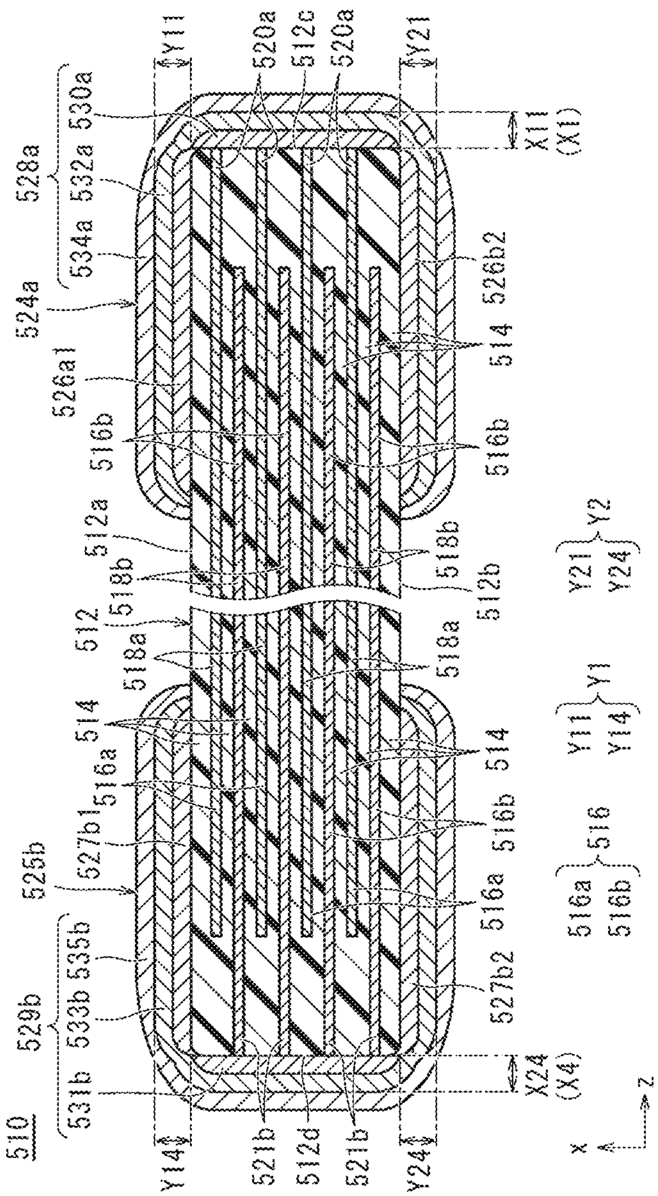
FIG. 21A is a schematic cross-sectional view taken along line XXIa-XXIa according to FIG. 18, and is a schematic cross-sectional view for describing a structure of an external electrode of the multilayer ceramic capacitor as an example of the multilayer ceramic electronic component according to the second preferred embodiment of the present invention.
Figure 21B:
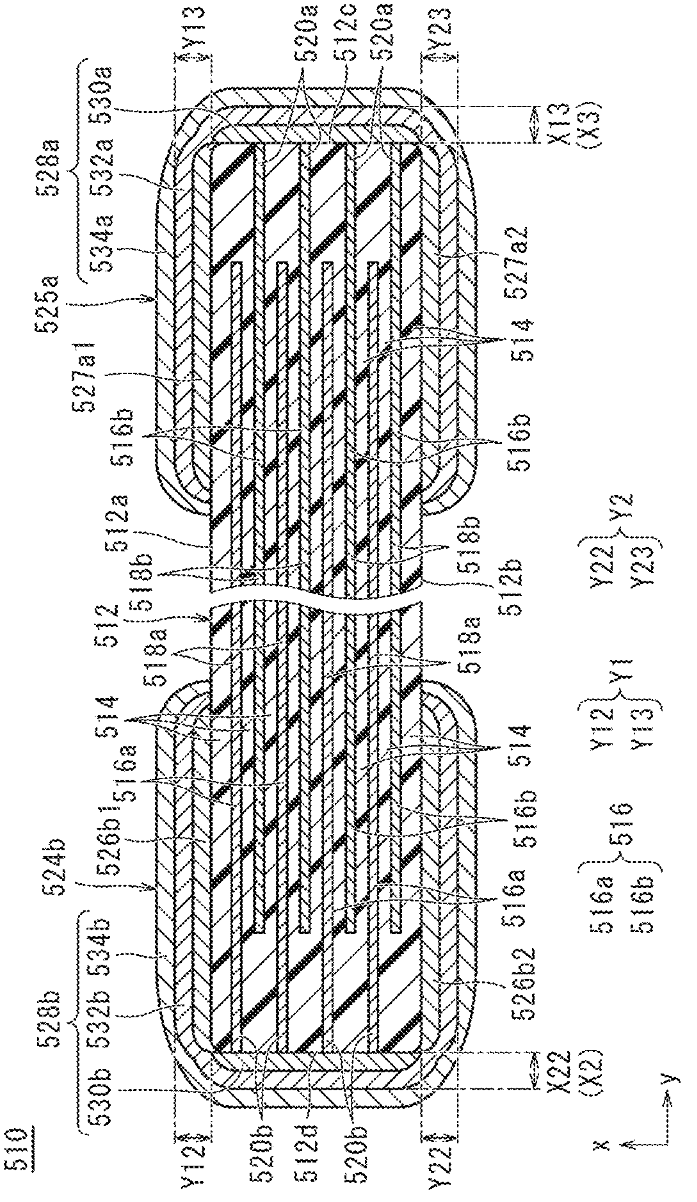
FIG. 21B is a schematic cross-sectional view taken along line XXIb-XXIb according to FIG. 18, and is a schematic cross-sectional view for describing a structure of the external electrode of the multilayer ceramic capacitor as an example of the multilayer ceramic electronic component according to the second preferred embodiment of the present invention.
Figure 21C:
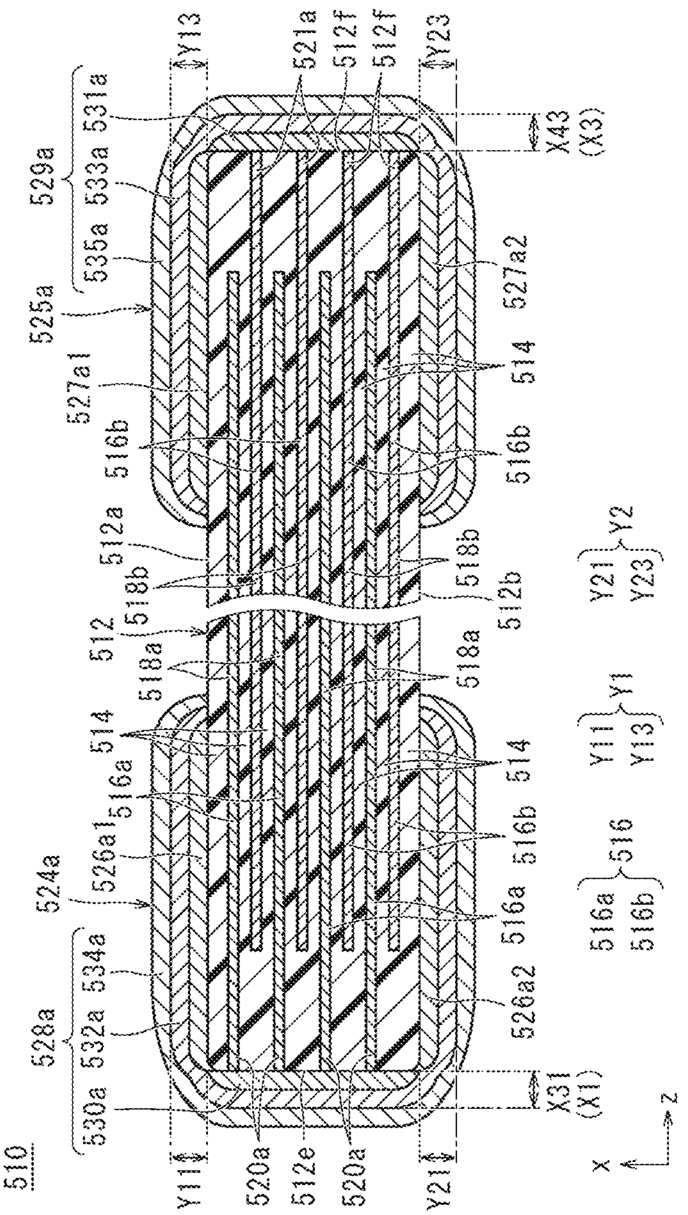
FIG. 21C is a schematic cross-sectional view taken along line XXIc-XXIc according to FIG. 18, and is a schematic cross-sectional view for describing a structure of the external electrode of the multilayer ceramic capacitor as an example of the multilayer ceramic electronic component according to the second preferred embodiment of the present invention.
Figure 21D:
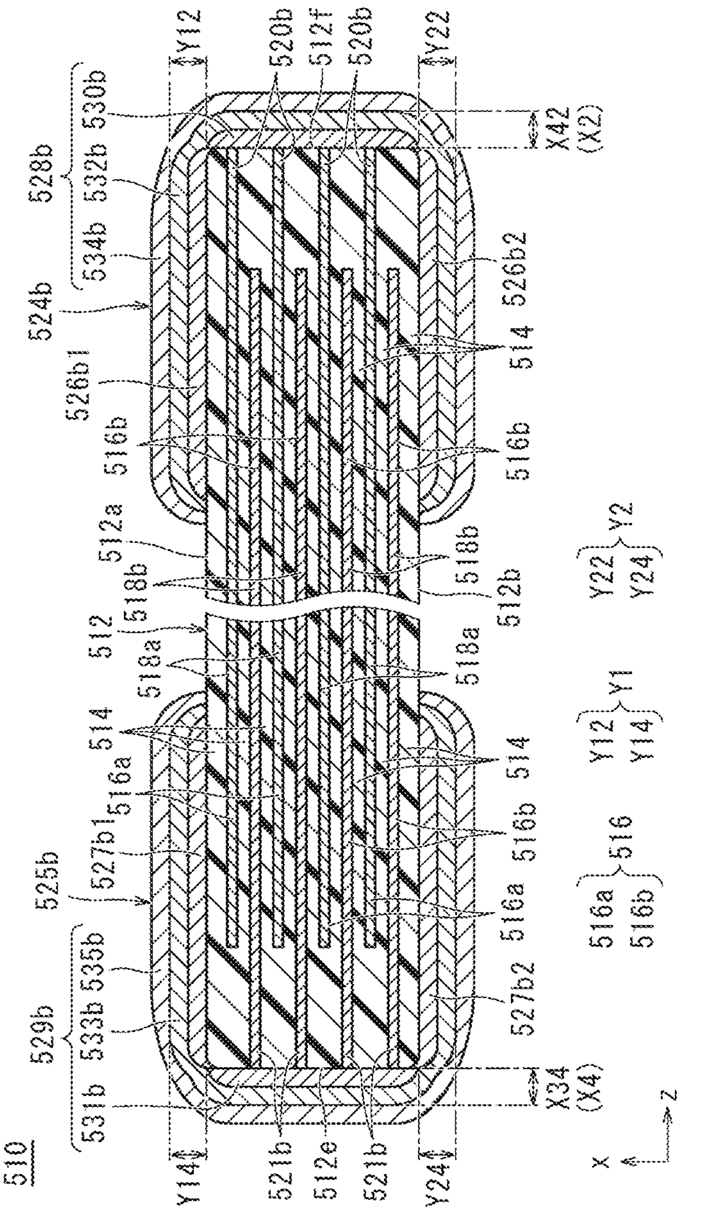
FIG. 21D is a schematic cross-sectional view taken along line XXId-XXId according to FIG. 18, and is a schematic cross-sectional view for describing a structure of the external electrode of the multilayer ceramic capacitor as an example of the multilayer ceramic electronic component according to the second preferred embodiment of the present invention.

Next, a multilayer ceramic capacitor according to a second preferred embodiment of the present invention will be described. FIG. 15 is an external perspective view illustrating a multilayer ceramic capacitor as an example of a multilayer ceramic electronic component according to a second preferred embodiment of the present invention. FIG. 16 is a cross-sectional view taken along line XVI-XVI according to FIG. 15. FIG. 17 is a cross-sectional view taken along line XVII-XVII according to FIG. 15. FIG. 18 is a cross-sectional view taken along line XVIII-XVIII according to FIG. 15. FIG. 19 is an exploded perspective view of a multilayer body illustrated in FIG. 15. FIG. 20A is a view illustrating a first internal electrode pattern of the multilayer ceramic capacitor illustrated in FIG. 15. FIG. 20B is a view illustrating a second internal electrode pattern of the multilayer ceramic capacitor illustrated in FIG. 15. FIG. 21A is a schematic cross-sectional view taken along line XXIa-XXIa according to FIG. 18, and is a schematic cross-sectional view for describing a structure of an external electrode of the multilayer ceramic capacitor as an example of the multilayer ceramic electronic component according to the second preferred embodiment of the present invention. FIG. 21B is a schematic cross-sectional view taken along line XXIb-XXIb according to FIG. 18, and is a schematic cross-sectional view for describing a structure of the external electrode of the multilayer ceramic capacitor as an example of the multilayer ceramic electronic component according to the second preferred embodiment of the present invention. FIG. 21C is a schematic cross-sectional view taken along line XXIc-XXIc according to FIG. 18, and is a schematic cross-sectional view for describing a structure of the external electrode of the multilayer ceramic capacitor as an example of the multilayer ceramic electronic component according to the second preferred embodiment of the present invention. FIG. 21D is a schematic cross-sectional view taken along line XXId-XXId according to FIG. 18, and is a schematic cross-sectional view for describing a structure of the external electrode of the multilayer ceramic capacitor as an example of the multilayer ceramic electronic component according to the second preferred embodiment of the present invention.

A multilayer ceramic capacitor 510 includes a multilayer body 512 and external electrodes 524 and 525.

Multilayer body 512 includes a plurality of ceramic layers 514 and a plurality of internal electrode layers 516. Multilayer body 512 includes a first main surface 512*a* and a second main surface 512*b* facing each other in a height direction x, a first side surface 512*c* and a second side surface 512*d* facing each other in a width direction y orthogonal or substantially orthogonal to height direction x, and a third side surface 512*e* and a fourth side surface 512*f* facing each other in a length direction z orthogonal or substantially orthogonal to height direction x and width direction y. First main surface 512*a* and second main surface 512*b* individually extend along width direction y and length direction z. First side surface 512*c* and second side surface 512*d* individually extend along height direction x and a width direction z. Third side surface 512*e* and fourth side surface 512*f* individually extend along height direction x and length direction y. Therefore, height direction x is a direction connecting first main surface 512*a* and second main surface 512*b*, width direction y is a direction connecting first side surface 512*c* and second side surface 512*d*, and length direction z is a direction connecting third side surface 512*e* and fourth side surface 512*f*.

In addition, in multilayer body 512, corner portions and ridge portions are preferably rounded. The corner portion is a portion where three surfaces of multilayer body 512 intersect, and the ridge portion is a portion where two surfaces of multilayer body 512 intersect.

As illustrated in FIGS. 16 and 17, in height direction x connecting first main surface 512*a* and second main surface 512*b*, multilayer body 512 includes an effective layer portion 515*a* where a plurality of internal electrode layers 516 face each other, a first outer layer portion 515*b*1 including a plurality of ceramic layers 514 located between first main surface 512*a* and internal electrode layer 516 located closest to first main surface 512*a*, and a second outer layer portion 515*b*2 including the plurality of ceramic layers 514 located between second main surface 512*b* and internal electrode layer 516 located closest to second main surface 512*b*.

First outer layer portion 515*b*1 is located on first main surface 512*a* side of multilayer body 512, and includes the plurality of ceramic layers 514 located between first main surface 512*a* and internal electrode layer 516 closest to first main surface 512*a* and between with the plurality of ceramic layers 514.

Second outer layer portion 515*b*2 is located on second main surface 512*b* side of multilayer body 512, and includes a plurality of ceramic layers 514 located between second main surface 512*b* and internal electrode layer 516 closest to second main surface 512*b* and located between with the plurality of ceramic layers 514.

Then, a region sandwiched between first outer layer portion 515*b*1 and second outer layer portion 515*b*2 is effective layer portion 515*a*. The number of ceramic layers 514 to be laminated is not particularly limited, but is preferably, for example, greater than or equal to 10 and less than or equal to 700, including first outer layer portion 515*b*1 and second outer layer portion 515*b*2. Further, a thickness of ceramic layer 514 is preferably, for example, greater than or equal to about 0.4 μm and less than or equal to about 5.0 μm.

A thickness of first outer layer portion 515*b*1 and second outer layer portion 515*b*2 is preferably, for example, greater than or equal to about 3 μm and less than or equal to about 15 μm. A region sandwiched between both outer layer parts 515*b*1 and 515*b*2 is effective layer portion 515*a*. That is, effective layer portion 515*a* is a region where internal electrode layers 516 are laminated.

Ceramic layer 514 can be made of, for example, a dielectric material. As the dielectric material, for example, a dielectric ceramic including $BaTiO_3$, $CaTiO_3$, $SrTiO_3$, $CaZnO_3$, or the like as a main component can be used. In addition, those obtained by adding an accessory component such as, for example, a Mn compound, an Fe compound, a Cr compound, a Co compound, or a Ni compound to these main components may be used.

Dimensions of multilayer body 512 are not particularly limited, but preferably, for example, the L dimension is greater than or equal to about 0.43 mm and less than or equal to about 0.73 mm and satisfies 0.85 W/L 1.0, and the T dimension is greater than or equal to about 50 μm and less than or equal to about 90 μm.

As illustrated in FIGS. 16 to 19, internal electrode layer 516 includes a plurality of first internal electrode layers 516*a* and a plurality of second internal electrode layers 516*b*. First internal electrode layer 516*a* and second internal electrode layers 516*b* are alternately laminated with ceramic layer 514 interposed therebetween.

First internal electrode layer 516*a* is disposed on a surface of ceramic layer 514. In addition, first internal electrode layer 516*a* includes a first counter electrode portion 518*a* facing first main surface 512*a* and second main surface 512*b* and facing second internal electrode layer 516*b*, and is laminated in a direction connecting first main surface 512*a* and second main surface 512*b*.

Further, second internal electrode layer 516*b* is disposed on a surface of the ceramic layer 514 different from ceramic layer 514 on which first internal electrode layer 516*a* is disposed. Second internal electrode layer 516*b* includes a second counter electrode portion 518*b* facing first main surface 512*a* and second main surface 512*b*, and is laminated in a direction connecting first main surface 512*a* and second main surface 512*b*.

As illustrated in FIGS. 18 to 20B, first internal electrode layer 516*a* extends to first side surface 512*c* and third side surface 512*e* of multilayer body 512 by a first extraction electrode portion 520*a*, and extends to second side surface 512*d* and fourth side surface 512*f* of multilayer body 512 by a second extraction electrode portion 520*b*. A width of first extraction electrode portion 520*a* extending to first side surface 512*c* may be equal or substantially equal to a width extending to third side surface 512*e*, and a width of second extraction electrode portion 520*b* extending to second side surface 512*d* may be equal or substantially equal to a width extending to fourth side surface 512*f*.

That is, first extraction electrode portion 520*a* extends to third side surface 512*e* side of multilayer body 512, and second extraction electrode portion 520*b* extends to fourth side surface 512*f* side of multilayer body 512.

Second internal electrode layer 516*b* extends to first side surface 512*c* and fourth side surface 512*f* of multilayer body 512 by a third extraction electrode portion 521*a*, and extends to second side surface 512*d* and third side surface 512*e* of multilayer body 512 by a fourth extraction electrode portion 521*b*. A width of third extraction electrode portion 521*a* extending to first side surface 512*c* may be equal substantially equal to a width extending to fourth side surface 512*f*, and a width of fourth extraction electrode portion 521*b* extending to second side surface 512*d* may be equal or substantially equal to a width extending to third side surface 512*e*.

That is, third extraction electrode portion 521*a* extends to fourth side surface 512*f* side of multilayer body 512, and fourth extraction electrode portion 521*b* extends to third side surface 512*e* side of multilayer body 512.

Further, when multilayer ceramic capacitor 510 is viewed from a laminating direction, a straight line connecting first extraction electrode portion 520*a* and second extraction electrode portion 520*b* in first internal electrode layer 516*a* and a straight line connecting third extraction electrode portion 521*a* and fourth extraction electrode portion 521*b* in second internal electrode layer 516*b* preferably intersect each other.

Further, on side surfaces 512*c*, 512*d*, 512*e*, and 512*f* of multilayer body 512, it is preferable that first extraction electrode portion 520*a* of first internal electrode layer 516*a* and fourth extraction electrode portion 521*b* of second internal electrode layer 516*b* extend to positions facing each other, and second extraction electrode portion 520*b* of first internal electrode layer 516*a* and third extraction electrode portion 521*a* of second internal electrode layer 516*b* extend to positions facing each other.

Further, as illustrated in FIG. 18, multilayer body 512 includes an end portion (L gap) 522*b* of multilayer body 512 between third side surface 512*e* and one end in length direction z of first counter electrode portion 518*a* and between fourth side surface 512*f* and another end in length direction z of second counter electrode portion 518*b*. An average length in width direction z of end portion (L gap) 522*b* of multilayer body 512 is preferably, for example, greater than or equal to about 10 μm and less than or equal to about 60 μm, more preferably greater than or equal to about 10 μm and less than or equal to about 30 μm, and still more preferably greater than or equal to about 10 μm and less than or equal to about 20 μm.

Further, as illustrated in FIG. 18, multilayer body 512 includes a side portion (W gap) 522*a* of multilayer body 512 between first side surface 512*c* and one end of first counter electrode portion 518*a* in width direction y and between second side surface 512*d* and another end of second counter electrode portion 518*b* in width direction y. An average length in length direction y of side portion (W gap) 522*a* of multilayer body 512 is preferably, for example, greater than or equal to about 10 μm and less than or equal to about 60 μm, more preferably greater than or equal to about 10 μm and less than or equal to about 30 μm, and still more preferably greater than or equal to about 10 μm and less than or equal to about 20 μm.

As a material, internal electrode layer 516 can be made by, for example, a metal such as Ni, Cu, Ag, Pd, or Au, or an alloy including one of these metals, for example, an Ag—Pd alloy. Internal electrode layer 516 may further include dielectric particles having the same or substantially the same compositional system as a ceramic included in ceramic layer 514. The number of laminated internal electrode layers 516 is preferably, for example, greater than or equal to 20 and less than or equal to 80. An average thickness of internal electrode layer 516 is preferably, for example, greater than or equal to about 0.2 μm and less than or equal to about 2.0 μm.

As illustrated in FIGS. 15 to 18, external electrodes 524 and 525 are disposed on multilayer body 512.

External electrode 524 includes a base electrode layer 526, and a plating layer 528 covering base electrode layer 526.

External electrode 525 includes a base electrode layer 527 and a plating layer 529 covering base electrode layer 527.

External electrode 524 includes a first external electrode 524*a* and a second external electrode 524*b*.

First external electrode 524*a* covers first extraction electrode portion 520*a* on first side surface 512*c* and third side surface 512*e*, and covers a portion of first main surface 512*a* and second main surface 512*b*. First external electrode 524*a* is electrically connected to first extraction electrode portion 520*a* of first internal electrode layer 516*a*.

Further, second external electrode 524*b* covers second extraction electrode portion 520*b* on second side surface 512*d* and fourth side surface 512*f*, and covers a portion of first main surface 512*a* and second main surface 512*b*. Second external electrode 524*b* is electrically connected to second extraction electrode portion 520*b* of first internal electrode layer 516*a*.

External electrode 525 includes a third external electrode 525*a* and a fourth external electrode 525*b*.

Third external electrode 525*a* covers third extraction electrode portion 521*a* on first side surface 512*c* and fourth side surface 512*f*, and covers a portion of first main surface 512*a* and second main surface 512*b*. Third external electrode 525*a* is electrically connected to third extraction electrode portion 521*a* of second internal electrode layer 516*b*.

Further, fourth external electrode 525*b* covers fourth extraction electrode portion 521*b* on second side surface 512*d* and third side surface 512*e*, and covers a portion of first main surface 512*a* and second main surface 512*b*. Fourth external electrode 525*b* is electrically connected to fourth extraction electrode portion 521*b* of second internal electrode layer 516*b*.

In multilayer body 512, first counter electrode portion 518*a* of first internal electrode layer 516*a* and second counter electrode portion 518*b* of second internal electrode layer 516*b* face each other with ceramic layer 514 interposed therebetween, which generates electrostatic capacitance. Therefore, electrostatic capacitance can be obtained between first external electrode 524*a* and second external electrode 524*b* to which first internal electrode layer 516*a* is connected and third external electrode 525*a* and fourth external electrode 525*b* to which second internal electrode layer 516*b* is connected, and characteristics of the capacitor are obtained.

Base electrode layer 526 includes a first base electrode layer 526*a*1, a second base electrode layer 526*a*2, a third base electrode layer 526*b*1, and a fourth base electrode layer 526*b*2. First base electrode layer 526*a*1, second base electrode layer 526*a*2, third base electrode layer 526*b*1, and fourth base electrode layer **526*b*2** include a thin film layer including a plurality of thin film electrodes, in order to further improve performance.

First base electrode layer **526*a*1 covers a portion of first main surface 512*a* at a corner portion where first main surface 512*a*, first side surface 512*c*, and third side surface 512*e*** intersect.

Second base electrode layer **526*a*2 covers a portion of second main surface 512*b* at a corner portion where second main surface 512*b*, first side surface 512*c*, and third side surface 512*e*** intersect.

Third base electrode layer **526*b*1 covers a portion of first main surface 512*a* at a corner portion where first main surface 512*a*, second side surface 512*d*, and fourth side surface 512*f*** intersect.

Fourth base electrode layer **526*b*2 covers a portion of second main surface 512*b* at a corner portion where second main surface 512*b*, second side surface 512*d*, and fourth side surface 512*f*** intersect.

Base electrode layer 527 includes a fifth base electrode layer **527*a*1, a sixth base electrode layer 527*a*2, a seventh base electrode layer 527*b*1, and an eighth base electrode layer 527*b*2. Fifth base electrode layer 527*a*1, sixth base electrode layer 527*a*2, seventh base electrode layer 527*b*1, and eighth base electrode layer 527*b*2** include a thin film layer including a plurality of thin film electrodes, in order to further improve performance.

Fifth base electrode layer **527*a*1 covers a portion of first main surface 512*a* at a corner portion where first main surface 512*a*, first side surface 512*c*, and fourth side surface 512*f*** intersect.

Sixth base electrode layer **527*a*2 covers a portion of second main surface 512*b* at a corner portion where second main surface 512*b*, first side surface 512*c*, and fourth side surface 512*f*** intersect.

Seventh base electrode layer **527*b*1 covers a portion of first main surface 512*a* at a corner portion where first main surface 512*a*, second side surface 512*d*, and third side surface 512*e*** intersect.

Eighth base electrode layer **527*b*2 covers a portion of second main surface 512*b* at a corner portion where second main surface 512*b*, second side surface 512*d*, and third side surface 512*e*** intersect.

Base electrode layers 526 and 527 defined by the thin film layer are preferably formed by a thin film forming method such as, for example, a sputtering method or a vapor deposition method. In particular, base electrode layers 526 and 527 defined by the thin film layer are preferably a sputtering electrode formed by a sputtering method. Hereinafter, an electrode formed by the sputtering method will be described.

When base electrode layers 526 and 527 are formed with a sputtering electrode, it is preferable to directly form the sputtering electrode on a portion of first main surface **512*a* and a portion of second main surface 512*b* of multilayer body 512**.

Base electrode layers 526 and 527 formed by the sputtering electrode include, for example, at least one selected from Ni, Cr, Cu, Ti, and the like.

A thickness of the sputtering electrode in height direction x connecting first main surface **512*a* and second main surface 512*b*** is preferably, for example, greater than or equal to about 50 nm and less than or equal to about 400 nm, and preferably greater than or equal to about 50 nm and less than or equal to about 130 nm.

Plating layer 528 includes a first plating layer **528*a* and a second plating layer 528*b***.

First plating layer **528*a* covers first base electrode layer 526*a*1 and second base electrode layer 526*a*2**.

Second plating layer **528*b* covers third base electrode layer 526*b*1 and fourth base electrode layer 526*b*2**.

Plating layer 529 includes a third plating layer **529*a* and a fourth plating layer 529*b***.

Third plating layer **529*a* covers fifth base electrode layer 527*a*1 and sixth base electrode layer 527*a*2**.

Fourth plating layer **529*b* covers seventh base electrode layer 527*b*1 and eighth base electrode layer 527*b*2**.

Plating layer 528 and plating layer 529 include a plurality of layers.

Preferably, plating layer 528 includes a lower layer plating layer 530, a middle layer plating layer 532 covering base electrode layer 526 and lower layer plating layer 530, and an upper layer plating layer 534 covering middle layer plating layer 532. Similarly, plating layer 529 includes a lower layer plating layer 531, a middle layer plating layer 533 covering base electrode layer 527 and lower layer plating layer 531, and an upper layer plating layer 535 covering middle layer plating layer 533.

In plating layer 528, upper layer plating layer 534 includes, for example, at least one selected from Ni, Sn, Cu, Ag, Pd, an Ag—Pd alloy, Au, and the like. Similarly, in plating layer 529, upper layer plating layer 535 includes, for example, at least one selected from Ni, Sn, Cu, Ag, Pd, an Ag—Pd alloy, Au, and the like.

Lower layer plating layer 530 includes a first lower layer plating layer **530*a* and a second lower layer plating layer 530*b***.

First lower layer plating layer **530*a* is disposed from a portion on third side surface 512*e* on first side surface 512*c* side to a portion on first side surface 512*c* on third side surface 512*e* side of multilayer body 512 on which the base electrode layer 526 is not disposed. More specifically, first lower layer plating layer 530*a* is disposed on a surface of multilayer body 512 so as to cover first internal electrode layer 516*a* exposed on first side surface 512*c* and third side surface 512*e***.

Second lower layer plating layer **530*b* is disposed from a portion on fourth side surface 512*f* on second side surface 512*d* side to a portion on second side surface 512*d* on fourth side surface 512*f* side of multilayer body 512 on which the base electrode layer 526 is not disposed. More specifically, second lower layer plating layer 530*b* is disposed on a surface of multilayer body 512 so as to cover first internal electrode layer 516*a* exposed on second side surface 512*d* and fourth side surface 512*f***.

Lower layer plating layer 531 includes a third lower layer plating layer **531*a* and a fourth lower layer plating layer 531*b***.

Third lower layer plating layer **531*a* is disposed from a portion on fourth side surface 512*f* on first side surface 512*c* side to a portion on first side surface 512*c* on fourth side surface 512*f* side of multilayer body 512 on which the base electrode layer 527 is not disposed. More specifically, third lower layer plating layer 531*a* is disposed on a surface of multilayer body 512 so as to cover second internal electrode layer 516*b* exposed on first side surface 512*c* and fourth side surface 512*f***.

Fourth lower layer plating layer **531*b* is disposed from a portion on third side surface 512*e* on second side surface 512*d* side to a portion on second side surface 512*d* on third side surface 512*e* side of multilayer body 512 on which the base electrode layer 527 is not disposed. More specifically, fourth lower layer plating layer 531*b* is disposed on a surface of multilayer body 512 so as to cover second internal electrode layer 516***b* exposed on second side surface 512*d* and third side surface 512*e*.

Lower layer plating layers 530 and 531 preferably include, for example, at least one selected from Cu, Ni, Sn, Ag, Pd, an Ag—Pd alloy, Au, and the like. Among them, lower layer plating layers 530 and 531 are preferably a Cu plating. This provides an advantageous effects of reducing or preventing entry of a plating solution when upper layer plating layers 534 and 535 are formed.

A thickness of lower layer plating layers 530 and 531 is preferably greater than or equal to about 2 μm and less than or equal to about 11 μm, for example.

Middle layer plating layer 532 includes a first middle layer plating layer 532*a* and a second middle layer plating layer 532*b*.

First middle layer plating layer 532*a* is disposed on a surface of first lower layer plating layer 530*a*, a portion of surfaces of first side surface 512*c* and third side surface 512*e* on which first lower layer plating layer 530*a* is not disposed, and surfaces of first base electrode layer 526*a*1 and second base electrode layer 526*a*2.

Second middle layer plating layer 532*b* is disposed on a surface of second lower layer plating layer 530*b*, a portion of surfaces of second side surface 512*d* and fourth side surface 512*f* on which second lower layer plating layer 530*b* is not disposed, and surfaces of third base electrode layer 526*b*1 and fourth base electrode layer 526*b*2.

Middle layer plating layer 533 includes a third middle layer plating layer 533*a* and a fourth middle layer plating layer 533*b*.

Third middle layer plating layer 533*a* is disposed on a surface of third lower layer plating layer 531*a*, a portion of surfaces of first side surface 512*c* and fourth side surface 512*f* on which third lower layer plating layer 531*a* is not disposed, and surfaces of fifth base electrode layer 527*a*1 and sixth base electrode layer 527*a*2.

Fourth middle layer plating layer 533*b* is disposed on a surface of fourth lower layer plating layer 531*b*, a portion of surfaces of second side surface 512*d* and third side surface 512*e* on which fourth lower layer plating layer 531*b* is not disposed, and surfaces of seventh base electrode layer 527*b*1 and eighth base electrode layer 527*b*2.

Middle layer plating layers 532 and 533 preferably include, for example, at least one selected from Cu, Ni, Sn, Ag, Pd, an Ag—Pd alloy, Au, and the like. Among them, middle layer plating layers 532 and 533 are preferably a Cu plating. This provides an advantageous effect of reducing or preventing entry of a plating solution when upper layer plating layers 534 and 535 are formed.

A thickness of middle layer plating layers 532 and 533 is preferably greater than or equal to about 2 μm and less than or equal to about 11 μm, for example.

Upper layer plating layer 534 includes a first upper layer plating layer 534*a* and a second upper layer plating layer 534*b*.

First upper layer plating layer 534*a* is disposed so as to cover first middle layer plating layer 532*a*. Specifically, first upper layer plating layer 534*a* is disposed on first side surface 512*c* and third side surface 512*e* on the surface of first middle layer plating layer 532*a*, and is provided so as to also extend to first main surface 512*a* and second main surface 512*b* on the surface of first middle layer plating layer 532*a*.

Second upper layer plating layer 534*b* covers second middle layer plating layer 532*b*. Specifically, second upper layer plating layer 534*b* is disposed on second side surface 512*d* and fourth side surface 512*f* on the surface of second middle layer plating layer 532*b*, and is provided so as to also extend to first main surface 512*a* and second main surface 512*b* on the surface of second middle layer plating layer 532*b*.

Upper layer plating layer 535 includes a third upper layer plating layer 535*a* and a fourth upper layer plating layer 535*b*.

Third upper layer plating layer 535*a* covers third middle layer plating layer 533*a*. Specifically, third upper layer plating layer 535*a* is disposed on first side surface 512*c* and fourth side surface 512*f* on the surface of third middle layer plating layer 533*a*, and is provided so as to also extend to first main surface 512*a* and second main surface 512*b* on the surface of third middle layer plating layer 533*a*.

Fourth upper layer plating layer 535*b* covers fourth middle layer plating layer 533*b*. Specifically, fourth upper layer plating layer 535*b* is disposed on second side surface 512*d* and third side surface 512*e* on the surface of fourth middle layer plating layer 533*b*, and is provided so as to also extend to first main surface 512*a* and second main surface 512*b* on the surface of fourth middle layer plating layer 533*b*.

In the present preferred embodiment, upper layer plating layers 534 and 535 have a two-layer structure including, for example, an Ni plating layer and an Sn plating layer provided in this order. The Ni plating layer covers surfaces of middle layer plating layers 532 and 533, which makes it possible to reduce or prevent erosion of base electrode layers 526 and 527 due to solder when multilayer ceramic capacitor 510 is mounted on the mounting substrate. By providing the Sn plating layer, wettability of solder when multilayer ceramic capacitor 510 is mounted on the mounting substrate can be improved, and multilayer ceramic capacitor 510 can be easily mounted.

A thickness per layer of upper layer plating layers 534 and 535 is preferably, for example, greater than or equal to about 2 μm and less than or equal to about 11 μm.

In the present preferred embodiment, at least one of, in first external electrode 524*a*, a sum of a thickness in width direction y of lower layer plating layer 530 and a thickness in width direction y of middle layer plating layer 532 located on first side surface 512*c*, or a sum of a thickness in length direction z of lower layer plating layer 530 and a thickness in length direction z of middle layer plating layer 532 located on third side surface 512*e* is defined as X1, at least one of, in second external electrode 524*b*, a sum of a thickness in width direction y of lower layer plating layer 530 and a thickness in width direction y of middle layer plating layer 532 located on second side surface 512*d*, or a sum of a thickness in length direction z of lower layer plating layer 531 and a thickness in length direction z of middle layer plating layer 532 located on fourth side surface 512*f* is defined as X2, at least one of, in third external electrode 525*a*, a sum of a thickness in width direction y of lower layer plating layer 531 and a thickness in width direction y of middle layer plating layer 533 located on first side surface 512*c*, or a sum of a thickness in length direction z of lower layer plating layer 531 and a thickness in length direction z of middle layer plating layer 533 located on fourth side surface 512*f* is defined as X3, at least one of, in fourth external electrode 525*b*, a sum of a thickness in width direction y of lower layer plating layer 531 and a thickness in width direction y of middle layer plating layer 533 located on second side surface 512*d*, or a sum of a thickness in length direction z of lower layer plating layer 531 and a thickness in length direction z of middle layer plating layer

533 located on third side surface 512*e* is defined as X4, a sum of a thickness in height direction x of base electrode layers 526 and 527 and a thickness in height direction x of middle layer plating layers 532 and 533 located on first main surface 512*a* in first external electrode 524*a* to fourth external electrode 525*b* is defined as Y1, and a sum of a thickness in height direction x of base electrode layers 526 and 527 and a thickness in height direction x of middle layer plating layers 532 and 533 located on second main surface 512*b* in first external electrode 524*a* to fourth external electrode 525*b* is defined as Y2, a relationship of X1>Y1, X1>Y2, X2>Y1, X2>Y2, X3>Y1, X3>Y2, X4>Y1, and X4>Y2 is satisfied.

In the present preferred embodiment, more specifically, as illustrated in FIGS. 21A to 21D, each thickness is configured as follows.

In first external electrode 524*a*, a sum of a thickness in width direction y of first lower layer plating layer 530*a* and a thickness in width direction y of first middle layer plating layer 532*a* located on first side surface 512*c* is defined as X11, and a sum of a thickness in length direction z of first lower layer plating layer 530*a* and a thickness in length direction z of first middle layer plating layer 532*a* located on third side surface 512*e* is defined as X31.

A sum of a thickness in height direction x of first base electrode layer 526*a*1 and a thickness in height direction x of first middle layer plating layer 532*a* located on first main surface 512*a* is defined as Y11, and a sum of a thickness in height direction x of second base electrode layer 526*a*2 and a thickness in height direction x of first middle layer plating layer 532*a* located on second main surface 512*b* is defined as Y21.

At this time, a relationship of X11>Y11, X31>Y11, X11>Y21, and X31>Y21 is satisfied.

In second external electrode 524*b*, a sum of a thickness in width direction y of second lower layer plating layer 530*b* and a thickness in width direction y of second middle layer plating layer 532*b* located on second side surface 512*d* is defined as X22, and a sum of a thickness in length direction z of second lower layer plating layer 530*b* and a thickness in length direction z of second middle layer plating layer 532*b* located on fourth side surface 512*f* is defined as X42.

A sum of a thickness in height direction x of third base electrode layer 526*b*1 and a thickness in height direction x of second middle layer plating layer 532*b* located on first main surface 512*a* is defined as Y12, and a sum of a thickness in height direction x of fourth base electrode layer 526*b*2 and a thickness in height direction x of second middle layer plating layer 532*b* located on second main surface 512*b* is defined as Y22.

At this time, a relationship of X22>Y12, X42>Y12, X22>Y12, and X42>Y22 is satisfied.

In third external electrode 525*a*, a sum of a thickness in width direction y of third lower layer plating layer 531*a* and a thickness in width direction y of third middle layer plating layer 533*a* located on first side surface 512*c* is defined as X13, and a sum of a thickness in length direction z of third lower layer plating layer 531*a* and a thickness in length direction z of third middle layer plating layer 533*a* located on fourth side surface 512*f* is defined as X43.

A sum of a thickness in height direction x of fifth base electrode layer 527*a*1 and a thickness in height direction x of third middle layer plating layer 533*a* located on first main surface 512*a* is defined as Y13, and a sum of a thickness in height direction x of sixth base electrode layer 527*a*2 and a thickness in height direction x of third middle layer plating layer 533*a* located on second main surface 512*b* is defined as Y23.

At this time, a relationship of X13>Y13, X43>Y13, X13>Y23, and X43>Y23 is satisfied.

In fourth external electrode 525*b*, a sum of a thickness in width direction y of fourth lower layer plating layer 531*b* and a thickness in width direction y of fourth middle layer plating layer 533*b* located on second side surface 512*d* is defined as X24, and a sum of a thickness in length direction z of fourth lower layer plating layer 531*b* and a thickness in length direction z of fourth middle layer plating layer 533*b* located on third side surface 512*e* is defined as X34.

A sum of a thickness in height direction x of seventh base electrode layer 527*b*1 and a thickness in height direction x of fourth middle layer plating layer 533*b* located on first main surface 512*a* is defined as Y14, and a sum of a thickness in height direction x of eighth base electrode layer 527*b*2 and a thickness in height direction x of fourth middle layer plating layer 533*b* located on second main surface 512*b* is defined as Y24.

At this time, a relationship of X24>Y14, X34>Y14, X24>Y24, and X34>Y24 is satisfied.

This makes it possible to reduce a thickness of external electrodes 524 and 525 with respect to height direction x of multilayer ceramic capacitor 510, and thus the multilayer body can be made as thick as possible within the standard dimensions, and a degree of freedom in designing an effective area of internal electrode layer 516 can be improved. In addition, since both plating layers 528 and 529 having a sufficient thickness can be secured on both side surfaces 512*e* and 512*f* sides of multilayer body 512 from which internal electrode layers 516 are extracted, moisture entry from outside can be reduced or prevented.

X1, which is a sum of a thickness of lower layer plating layer 530 and a thickness of middle layer plating layer 532 in first external electrode 524*a*, is preferably, for example, greater than or equal to about 4 μm and less than or equal to about 12 μm.

X2, which is a sum of a thickness of lower layer plating layer 530 and a thickness of middle layer plating layer 532 in second external electrode 524*b*, is preferably, for example, greater than or equal to about 4 μm and less than or equal to about 12 μm.

X3, which is a sum of a thickness of lower layer plating layer 531 and a thickness of middle layer plating layer 533 in third external electrode 525*a*, is preferably, for example, greater than or equal to about 4 μm and less than or equal to about 12 μm.

X4, which is a sum of a thickness of lower layer plating layer 531 and a thickness of middle layer plating layer 533 in fourth external electrode 525*b*, is preferably, for example, greater than or equal to about 4 μm and less than or equal to about 12 μm.

Y11, which is a sum of a thickness in height direction x of first base electrode layer 526*a*1 and a thickness in height direction x of first middle layer plating layer 532*a* located on first main surface 512*a*, Y12, which is a sum of a thickness in height direction x of third base electrode layer 526*b*1 and a thickness in height direction x of second middle layer plating layer 532*b* located on first main surface 512*a*, Y13, which is a sum of a thickness in height direction x of fifth base electrode layer 527*a*1 and a thickness in height direction x of third middle layer plating layer 533*a* located on first main surface 512*a*, and Y14, which is a sum of a thickness in height direction x of seventh base electrode layer 527*b*1 and a thickness in height direction x of fourth middle layer plating layer 533b located on first main surface 512a, are preferably, for example, greater than or equal to about 2 μm and less than or equal to about 10 μm.

Y21, which is a sum of a thickness in height direction x of second base electrode layer 526a2 and a thickness in height direction x of first middle layer plating layer 532a located on second main surface 512b, Y22, which is a sum of a thickness in height direction x of fourth base electrode layer 526b2 and a thickness in height direction x of second middle layer plating layer 532b located on second main surface 512b, Y23, which is a sum of a thickness in height direction x of sixth base electrode layer 527a2 and a thickness in height direction x of third middle layer plating layer 533a located on second main surface 512b, and Y24, which is a sum of a thickness in height direction x of eighth base electrode layer 527b2 and a thickness in height direction x of fourth middle layer plating layer 533b located on second main surface 512b are preferably, for example, greater than or equal to about 2 μm and less than or equal to about 10 μm.

Further, a ratio X1/Y11 between X1 and Y11 and a ratio X1/Y21 between X1 and Y21 are preferably, for example, greater than or equal to about 1.5. A ratio X2/Y12 between X2 and Y12 and a ratio X2/Y22 between X2 and Y22 are preferably, for example, greater than or equal to about 1.5. A ratio X3/Y13 between X3 and Y13 and a ratio X3/Y23 between X3 and Y23 are preferably, for example, greater than or equal to about 1.5. A ratio X4/Y14 between X4 and Y14 and a ratio X4/Y24 between X4 and Y24 are preferably, for example, greater than or equal to about 1.5. This makes it possible to reduce a thickness of external electrodes 524 and 525 with respect to height direction x of multilayer ceramic capacitor 510, and thus the multilayer body can be made as thick as possible within the standard dimensions, and a degree of freedom in designing an effective area of internal electrode layer 516 can be improved. In addition, since plating layers 528 and 529 having a sufficient thickness can be secured on the end surface side of multilayer body 512 from which internal electrode layer 516 is extracted, moisture entry from outside can be reduced or prevented.

A thickness in length direction z of lower layer plating layers 530 and 531 located on first side surface 512c and second side surface 512d is preferably larger than a thickness in length direction z of middle layer plating layers 532 and 533 located on first side surface 512c and second side surface 512d. A thickness in length direction z of lower layer plating layers 530 and 531 located on third side surface 512e and fourth side surface 512f is preferably larger than a thickness in length direction z of middle layer plating layers 532 and 533 located on third side surface 512e and fourth side surface 512f. As a result, a thickness of lower layer plating layers 530 and 531 on a side closer to internal electrode layer 516 can be secured, and moisture entry can be further reduced or prevented.

Further, in the present preferred embodiment, on first side surface 512c to fourth side surface 512f where internal electrode layers 516 are exposed, a particle diameter of a metal included in lower layer plating layers 530 and 531 connected to internal electrode layer 516 is larger than a particle diameter of a metal included in middle layer plating layers 532 and 533 disposed on lower layer plating layers 530 and 531. As a result, the particle diameter of lower layer plating layers 530 and 531 on a side closer to the internal electrode layer is large, and thus the number of grain boundaries can be reduced as compared with a case where the particle diameter is small, so that a path of moisture entry can be reduced. Therefore, moisture entry can be reduced or prevented.

Further, on lower layer plating layers 530 and 531, middle layer plating layers 532 and 533 including metal having a particle diameter smaller than that of a metal included in lower layer plating layers 530 and 531 are disposed. As a result, since the particle diameter of metal particles of middle layer plating layers 532 and 533 is small, a compressive stress of middle layer plating layers 532 and 533 can be reduced. As a result, even when a thermal stress is applied, it is possible to reduce or prevent a tensile stress applied to a tip end portion of middle layer plating layers 532 and 533, and it is possible to reduce or prevent an occurrence of cracks in multilayer body 512 caused by the thermal stress.

A dimension in length direction z of multilayer ceramic capacitor 510 including multilayer body 512 and external electrodes 524 and 525 is defined as an L dimension, a dimension in height direction x of multilayer ceramic capacitor 510 including multilayer body 512 and external electrodes 524 and 525 is defined as a T dimension, and a dimension in width direction y of multilayer ceramic capacitor 510 including multilayer body 512 and external electrodes 524 and 525 is defined as a W dimension.

In dimensions of multilayer ceramic capacitor 510, preferably, for example, the L dimension in length direction z is greater than or equal to about 0.45 mm and less than or equal to about 0.75 mm, the T dimension in height direction x is greater than or equal to about 70 μm and less than or equal to about 110.0 mm, and the W dimension in width direction y is the W dimension satisfying about 0.85 W/L about 1.0.

Multilayer ceramic capacitor 510 illustrated in FIG. 15 has advantageous effects the same as or similar to those of multilayer ceramic capacitor 10 described above.

2. Modification of Second Preferred Embodiment

Figure 22A:
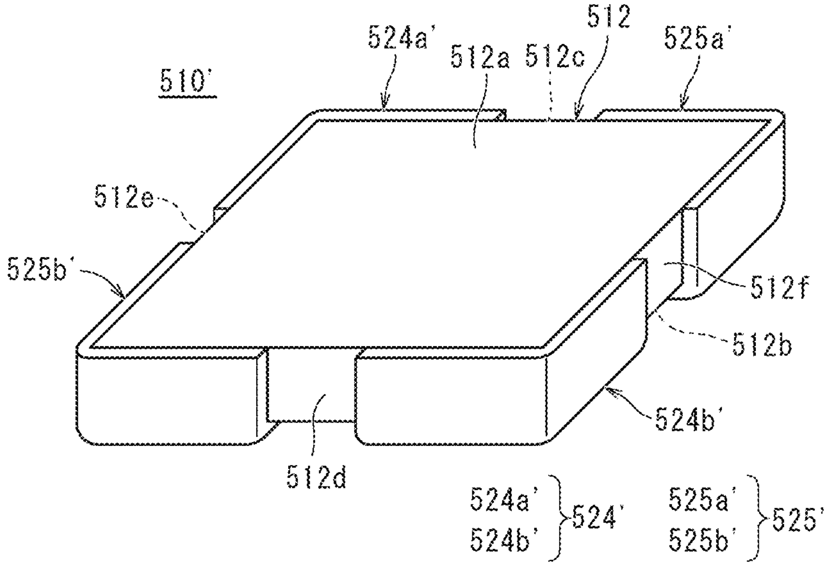
FIG. 22A is an external perspective view of a multilayer ceramic capacitor as an example of a multilayer ceramic electronic component according to a modification of the second preferred embodiment of the present invention.
Figure 22B:
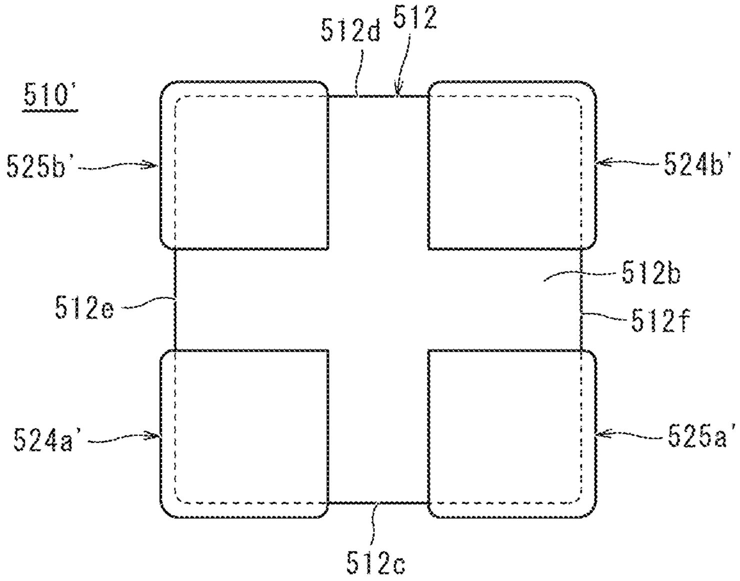
FIG. 22B is a bottom view of the multilayer ceramic capacitor as an example of the multilayer ceramic electronic component according to the modification of the second preferred embodiment of the present invention.

Next, a multilayer ceramic capacitor according to a modification of the second preferred embodiment of the present invention will be described. FIG. 22A is an external perspective view of a multilayer ceramic capacitor as an example of a multilayer ceramic electronic component according to a modification of the second preferred embodiment of the present invention. FIG. 22B is a bottom view of the multilayer ceramic capacitor as an example of the multilayer ceramic electronic component according to the modification of the second preferred embodiment of the present invention. In a multilayer ceramic capacitor 510' illustrated in FIG. 24, the same or corresponding portions as those of multilayer ceramic capacitor 510 illustrated in FIGS. 15 to 20B are denoted by the same reference numerals, and a description thereof will be omitted.

Multilayer ceramic capacitor 510' includes a rectangular or substantially rectangular parallelepiped multilayer body 512 and external electrodes 524' and 525'.

External electrode 524' includes a first external electrode 524a' electrically connected to a first extraction electrode portion 520a of a first internal electrode layer 516a, and a second external electrode 524b' electrically connected to second extraction electrode portion 520b.

First external electrode 524a' covers first extraction electrode portion 520a on a first side surface 512c and a third side surface 512e, and covers a portion of a second main surface 512b. Further, second external electrode 524b' covers second extraction electrode portion 520b on a second side surface 512*d* and a fourth side surface 512*f*, and covers a portion of second main surface 512*b*.

External electrode 525' includes a third external electrode 525*a*' electrically connected to a third extraction electrode portion 521*a* of a second internal electrode layer 516*b*, and a fourth external electrode 525*b*' electrically connected to a fourth extraction electrode portion 521*b*.

Third external electrode 525*a*' covers third extraction electrode portion 521*a* on first side surface 512*c* and fourth side surface 512*f*, and covers a portion of second main surface 512*b*.

Further, fourth external electrode 525*b*' covers fourth extraction electrode portion 521*b* on second side surface 512*d* and third side surface 512*e*, and covers a portion of second main surface 512*b*.

External electrodes 524' and 525' preferably include a base electrode layer and a plating layer in this order from multilayer body 512 side.

Further, a structure of plating layers 530 and 531 of multilayer ceramic capacitor 510' according to the present modification is the same or substantially the same as a structure of plating layers 530 and 531 of multilayer ceramic capacitor 510.

Multilayer ceramic capacitor 510' illustrated in FIGS. 22A and 22B has advantageous effects the same as or similar to those of multilayer ceramic capacitor 510 described above, and also has the following advantageous effects.

That is, since external electrodes 524' and 525' are not provided on a surface of a first main surface 512*a*, a thickness of multilayer body 512 can be increased by the absence of the thickness, and a strength of multilayer ceramic capacitor 510' can be improved and electrostatic capacitance per volume can be improved. In addition, since it is possible to reduce or prevent wetting up of solder on an upper surface (first main surface 512*a*) of multilayer ceramic capacitor 510' at a time of mounting, a thickness of multilayer body 512 can be further increased accordingly.

3. Method for Manufacturing Multilayer Ceramic Capacitor

Next, a non-limiting example of a method for manufacturing multilayer ceramic capacitors 510 and 510' will be described.

First, a ceramic green sheet and a conductive paste for internal electrodes are prepared. The ceramic green sheet and the conductive paste for internal electrodes include a binder (for example, a known organic binder or the like) and a solvent (for example, an organic solvent or the like).

Next, the conductive paste for internal electrodes is printed on the ceramic green sheet in a predetermined pattern by, for example, screen printing or gravure printing, to form an internal electrode pattern as illustrated in FIGS. 20A and 20B. Specifically, a conductive paste layer is formed by applying a paste made by a conductive material onto the ceramic green sheet by a method such as the printing described above. The paste made by the conductive material is, for example, obtained by adding an organic binder and an organic solvent to metal powder. Note that, as for the ceramic green sheet, a ceramic green sheet for outer layers on which no internal electrode pattern is printed is also produced.

Then, by using these ceramic green sheets on which the internal electrode pattern is formed, a multilayer sheet is produced. That is, by laminating a predetermined number of ceramic green sheets for outer layers on which no internal electrode pattern is formed, alternately laminating, on top of that, a ceramic green sheet on which an internal electrode pattern corresponding to first internal electrode layer 516*a* is formed and a ceramic green sheet on which an internal electrode pattern corresponding to second internal electrode layer 516*b* is formed, and further laminating, on top of that, a predetermined number of ceramic green sheets on which no internal electrode pattern is formed, a multilayer sheet is produced.

Subsequently, by pressure-bonding this multilayer sheet in the laminating direction by, for example, isostatic pressing, a multilayer block is produced.

Further, a multilayer block is produced by pressing the multilayer sheet in a laminating direction by, for example as isostatic pressing.

Subsequently, the multilayer block is cut into a predetermined size, and a multilayer chip is produced. At this time, corner portions and ridge portions of the multilayer chip may be rounded by barrel polishing or the like.

Figure 25:
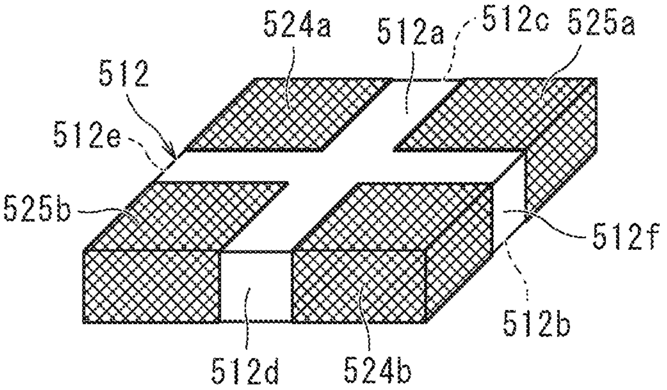
FIG. 25 is an external perspective view in which a plating layer is formed in the multilayer body illustrated in FIG. 24.

Next, by baking the multilayer chip, multilayer body 512 as illustrated in FIG. 25 is produced. A baking temperature is preferably, for example, greater than or equal to about 900° C. and less than or equal to about 1300° C., depending on a material of the ceramic or the internal electrode.

Figure 23:
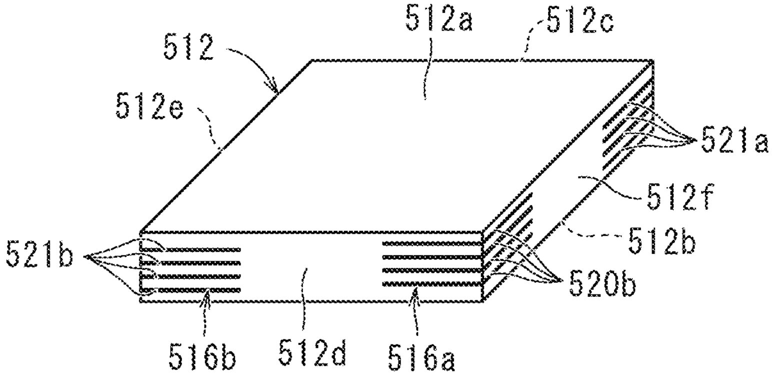
FIG. 23 is an external perspective view of the multilayer body of the multilayer ceramic capacitor illustrated in FIG. 15.

At this time, as illustrated in FIG. 23, first extraction electrode portion 520*a* of first internal electrode layer 516*a* is exposed from first side surface 512*c* and third side surface 512*e* of multilayer body 512, and third extraction electrode portion 521*a* of second internal electrode layer 516*b* is exposed from first side surface 512*c* and fourth side surface 512*f* of multilayer body 512. Further, second extraction electrode portion 520*b* of first internal electrode layer 516*a* is exposed from second side surface 512*d* and fourth side surface 512*f* of multilayer body 512, and fourth extraction electrode portion 521*b* of second internal electrode layer 516*b* is exposed from second side surface 512*d* and third side surface 512*e* of multilayer body 512.

Figure 24:
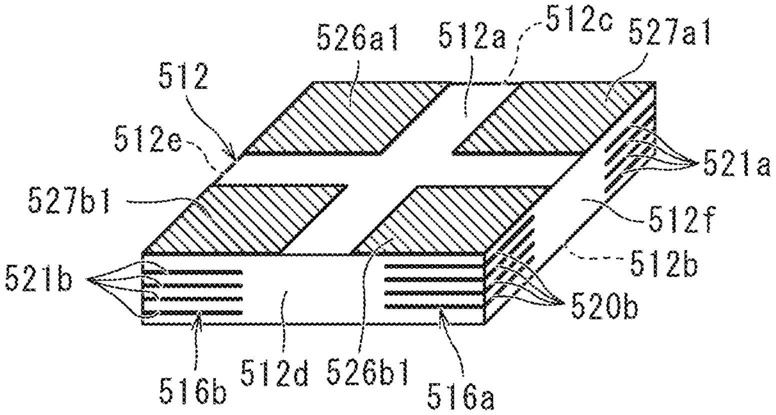
FIG. 24 is an external perspective view in which a base electrode layer is formed in the multilayer body illustrated in FIG. 23.

Subsequently, as illustrated in FIG. 24, base electrode layers 526 and 527 made by a thin film electrode layer are formed on a portion of first main surface 512*a* and a portion of second main surface 512*b* of multilayer body 512. Base electrode layers 526 and 527 as a thin film layer can be formed by, for example, a sputtering method or the like. In other words, base electrode layer as a thin film layer includes a sputtering electrode. The sputtering electrode can be formed by metal including, for example, at least one selected from Ni, Cr, Cu, Ti, and the like.

Note that, in a case where external electrodes 524' and 525' are formed in which no external electrode is disposed on first main surface 512*a* as in a case of multilayer ceramic capacitor 510', base electrode layers 526 and 527 are not formed on first main surface 512*a*.

Thereafter, lower layer plating layers 530 and 531 are formed so as to cover a region where internal electrode layers 516 are exposed on first side surface 512*c*, second side surface 512*d*, third side surface 512*e*, and fourth side surface 512*f* of multilayer body 512. Here, for lower layer plating layers 530 and 531, by, for example, electrolytic plating using an electrolytic plating bath to which an additive is added or electroless plating by a substitution reaction, lower layer plating layers 530 and 531 are formed. As the additive used for the electrolytic plating with the electrolytic plating bath, for example, a citric acid-based additive is used. In addition, a thickness of lower layer plating layers 530 and 531 and a particle diameter of a metal of lower layer plating layers 530 and 531 of a preferred embodiment of the present invention can be formed by changing plating conditions and performing heat treatment after forming lower layer plating layers 530 and 531. The plating conditions are, for example, a bath temperature, a bath ion concentration, and a current density in a case of electrolytic plating. As a condition for the heat treatment, it is preferable to perform the heat treatment in, for example, a range of greater than or equal to about 300° C. and less than or equal to about 900° C. for greater than or equal to about 0.5 hours and less than or equal to about 12 hours.

Subsequently, middle layer plating layers 532 and 533 are formed on lower layer plating layers 530 and 531, on first side surface 512*c*, second side surface 512*d*, third side surface 512*e*, and fourth side surface 512*f* on which lower layer plating layers 530 and 531 are not disposed, and on base electrode layers 526 and 527. For middle layer plating layers 532 and 533, by, for example, electrolytic plating using an electrolytic plating bath to which an additive is added or electroless plating by a substitution reaction, middle layer plating layers 532 and 533 are formed. As the additive used for the electrolytic plating with the electrolytic plating bath, for example, a citric acid-based additive is used. As the additive used for the electrolytic plating with the electrolytic plating bath, for example, a citric acid-based additive is used. Further, by changing plating conditions, a thickness of middle layer plating layers 532 and 533 and a particle diameter of a metal of middle layer plating layers 532 and 533 of the present invention can be formed. The plating conditions are, for example, a bath temperature, a bath ion concentration, and a current density in a case of electrolytic plating.

Thereafter, upper layer plating layer 534 is formed on a surface of middle layer plating layer 532, and upper layer plating layer 535 is formed on a surface of middle layer plating layer 533. Upper layer plating layers 534 and 535 include, for example, at least one selected from Cu, Ni, Sn, Ag, Pd, an Ag—Pd alloy, Au, and the like, and are formed by a single layer or a plurality of layers. Preferably, upper layer plating layers 534 and 535 are formed by, for example, two layers by forming an Ni plating layer and an Sn plating layer on the Ni plating layer.

In this way, as illustrated in FIG. 25, external electrodes 524 and 525 are formed.

As described above, multilayer ceramic capacitors 510 and 510' as illustrated in FIG. 16 or FIG. 23 are manufactured.

Although the multilayer ceramic electronic component having a laterally symmetrical or substantially symmetrical shape in front view has been exclusively illustrated in the above-preferred embodiments and each modification, the outer shape of the multilayer ceramic electronic component according to preferred embodiments of the present invention can be variously changed in accordance with a target of mounting and in accordance with required performance. Further, preferred embodiments of the present invention also include an appropriate combination of all or a portion of the configurations of the above-described preferred embodiments and each modification.

That is, various changes can be made regarding a mechanism, a shape, a material, a quantity, a position, an arrangement, and the like for the preferred embodiments and each modification described above without departing from the scope of the technical idea and the object of the present invention, and these are included in the present invention.

Preferred embodiments of the present invention relate to multilayer ceramic electronic components, and particularly can be used as a multilayer ceramic electronic component including an external electrode having a multilayer structure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:

a multilayer body including a plurality of ceramic layers that are laminated, the multilayer body including a first main surface and a second main surface facing each other in a height direction that is a laminating direction, a first side surface and a second side surface facing each other in a width direction orthogonal or substantially orthogonal to the height direction, and a first end surface and a second end surface facing each other in a length direction orthogonal or substantially orthogonal to the laminating direction and the width direction;

a first internal electrode layer on a ceramic layer among the plurality of ceramic layers and exposed to the first end surface;

a second internal electrode layer on a ceramic layer among the plurality of ceramic layers and exposed to the second end surface;

a first external electrode connected to the first internal electrode layer, and located on the first end surface, on a portion of the first main surface, and on a portion of the second main surface; and a second external electrode connected to the second internal electrode layer, and located on the second end surface, on a portion of the first main surface, and on a portion of the second main surface; wherein the first external electrode and the second external electrode include a base electrode layer and a plating layer;

the base electrode layer is a thin film electrode on at least a portion of the first main surface and a portion of the second main surface, the thin film electrode including at least one of Ni, Cr, Cu, or Ti;

the plating layer includes a lower layer plating layer exclusively on the first end surface and the second end surface, a middle layer plating layer on the lower layer plating layer, on the first end surface and the second end surface on which the lower layer plating layer is not located, and on the base electrode layer, and an upper layer plating layer on the middle layer plating layer;

when a sum of a thickness in the length direction of the lower layer plating layer and a thickness in the length direction of the middle layer plating layer on the first end surface is defined as X1, a sum of a thickness in the length direction of the lower layer plating layer and a thickness in the length direction of the middle layer plating layer on the second end surface is defined as X2, a sum of a thickness in the height direction of the base electrode layer and a thickness in the height direction of the middle layer plating layer on the first main surface is defined as Y1, and a sum of a thickness in the height direction of the base electrode layer and a thickness in the height direction of the middle layer plating layer on the second main surface is defined as Y2, a relationship of $X1>Y1$, $X1>Y2$, $X2>Y1$, $X2>Y2$ is satisfied; and a particle diameter of a metal included in the lower layer plating layer is larger than a particle diameter of a metal included in the middle layer plating layer.

2. The multilayer ceramic electronic component according to claim 1, wherein the first external electrode is located on a portion of the first side surface and a portion of the second side surface;

the second external electrode is located on a portion of the first side surface and a portion of the second side surface, the lower layer plating layer extends to the first side surface and the second side surface;

the middle layer plating layer is located on the lower layer plating layer and extends to the first side surface and the second side surface, the middle layer plating layer extending up to on the first side surface and the second side surface on which the lower layer plating layer is not located;

the upper layer plating layer is located on the middle layer plating layer;

when a sum of a thickness in the width direction of the lower layer plating layer and a thickness in the width direction of the middle layer plating layer on the first side surface is defined as Z1, and a sum of a thickness in the width direction of the lower layer plating layer and a thickness in the width direction of the middle layer plating layer on the second side surface is defined as Z2, a relationship of $Z1<X1$ and $Z2<X2$ is satisfied; and a particle diameter of a metal included in the lower layer plating layer is larger than a particle diameter of a metal included in the middle layer plating layer.

3. The multilayer ceramic electronic component according to claim 1, wherein a particle diameter of a metal included in the lower layer plating layer is greater than or equal to about 2 μm and less than or equal to about 4 μm; and a particle diameter of a metal included in the middle layer plating layer is greater than or equal to about 0.1 μm and less than or equal to about 2 μm.

4. The multilayer ceramic electronic component according to claim 1, wherein the lower layer plating layer includes a Cu plating; and the middle layer plating layer includes Cu plating.

5. The multilayer ceramic electronic component according to claim 1, wherein the upper layer plating layer includes a single plating layer or a plurality of plating layers.

6. The multilayer ceramic electronic component according to claim 1, wherein a thickness of the lower layer plating layer located on the first end surface and the second end surface is larger than a thickness of the middle layer plating layer located on the first end surface and the second end surface.

7. The multilayer ceramic electronic component according to claim 2, wherein a thickness of the lower layer plating layer located on the first side surface and the second side surface is larger than a thickness of the middle layer plating layer located on the first side surface and the second side surface.

8. The multilayer ceramic electronic component according to claim 2, wherein a particle diameter of a metal included in the lower layer plating layer is greater than or equal to about 2 μm and less than or equal to about 4 μm; and a particle diameter of a metal included in the middle layer plating layer is greater than or equal to about 0.1 μm and less than or equal to about 2 μm.

9. The multilayer ceramic electronic component according to claim 8, wherein a thickness of the lower layer plating layer located on the first side surface and the second side surface is larger than a thickness of the middle layer plating layer located on the first side surface and the second side surface.

10. The multilayer ceramic electronic component according to claim 1, wherein a number of the plurality of ceramic layers is greater than or equal to 10 and less than or equal to 700.

11. The multilayer ceramic electronic component according to claim 1, wherein a thickness of each of the plurality of ceramic layers is greater than or equal to about 0.4 μm and less than or equal to about 5.0 μm.

12. The multilayer ceramic electronic component according to claim 1, wherein each of the plurality of ceramic layers includes at least one of $BaTiO_3$, $CaTiO_3$, $SrTiO_3$, or $CaZnO_3$ as a main component.

13. The multilayer ceramic electronic component according to claim 1, wherein each of the plurality of ceramic layers includes at least one of $BaTiO_3$, $CaTiO_3$, $SrTiO_3$, or $CaZnO_3$ as a main component.

14. The multilayer ceramic electronic component according to claim 12, wherein each of the plurality of ceramic layers includes at least one of a Mn compound, an Fe compound, a Cr compound, a Co compound, or a Ni compound as an accessory component.

* * * * *